United States Patent
Cooper et al.

(10) Patent No.: US 7,221,650 B1
(45) Date of Patent: May 22, 2007

(54) SYSTEM AND METHOD FOR CHECKING DATA ACCUMULATORS FOR CONSISTENCY

(75) Inventors: Jeffrey L. Cooper, Gardner, MA (US); Henry Charles Benz, Hollis, NH (US)

(73) Assignee: Intel Corporation, Santa Clara, CA (US)

( * ) Notice: Subject to any disclaimer, the term of this patent is extended or adjusted under 35 U.S.C. 154(b) by 1052 days.

(21) Appl. No.: 10/328,445

(22) Filed: Dec. 23, 2002

(51) Int. Cl.
*H04L 12/28* (2006.01)
*H04J 1/16* (2006.01)

(52) U.S. Cl. .................. 370/236; 370/414; 370/395.1; 370/252

(58) Field of Classification Search ........ 370/229–231, 370/235, 252, 394, 412, 413, 449, 503, 414, 370/395.1, 236
See application file for complete search history.

(56) References Cited

U.S. PATENT DOCUMENTS

| | | | |
|---|---|---|---|
| 6,188,674 B1 * | 2/2001 | Chen et al. ................. | 370/252 |
| 6,647,019 B1 * | 11/2003 | McKeown et al. ......... | 370/422 |
| 6,904,507 B2 * | 6/2005 | Gil ............................. | 711/170 |
| 6,920,106 B1 * | 7/2005 | Chou et al. ................. | 370/229 |
| 2004/0081198 A1 * | 4/2004 | Gardner et al. ............. | 370/468 |

OTHER PUBLICATIONS

Quantum Flow Control, Version 2.0.5, pp. ii-vi and 7-90, Mar. 26, 1997.

* cited by examiner

*Primary Examiner*—Chau Nguyen
*Assistant Examiner*—Nittaya Juntima
(74) *Attorney, Agent, or Firm*—Blakely, Sokoloff, Taylor & Zafman LLP

(57) ABSTRACT

A system and method checks whether messages exchanged between first and second modules are being lost or gained. The first module has a request counter and a capture register. The second module has a request accumulator and a capture register. As the first module issues and receives messages, it increments and decrements its request counter. As the second module receives and issues messages, it increments and decrements its request accumulator. To check for lost or gained messages, the first module copies the current value of its request counter into its capture register, and issues a marker to the second module. The first module decrements its capture register in response to receiving post-marker messages, but does not increment its capture register. Upon receipt of the marker, the second module copies the current value of its request accumulator into its capture register, and returns the marker to the first module. When the first module receives the marker, it stops decrementing its capture register. The two capture registers should then contain the same values provided that no messages have been lost or gained.

23 Claims, 14 Drawing Sheets

SYSTEM AND METHOD FOR CHECKING DATA ACCUMULATORS FOR CONSISTENCY

BACKGROUND OF THE INVENTION

1. Field of the Invention

The present invention relates to communications networks and, more specifically, to a technique for identifying lost or gained messages, such as request or grant signals.

2. Background Information

Communication in a computer network involves the exchange of data between two or more entities interconnected by communication links. These entities are typically software programs executing on computer platforms, such as end nodes and intermediate network nodes. Examples of an intermediate network node may be a router or switch that interconnects the communication links to enable transmission of data between the end nodes, such as servers having processor, memory and input/output (I/O) storage resources.

Communication software executing on the end nodes correlates and manages data communication with other end nodes. The nodes typically communicate by exchanging discrete frames or packets of data according to predefined protocols. In this context, a protocol consists of a set of rules defining how the nodes interact with each other. In addition, network software executing on the intermediate nodes allows expansion of communication to other end nodes. Collectively, these hardware and software components comprise a communications network and their interconnections are defined by an under-lying architecture.

The InfiniBand Architecture (IBA) is an I/O specification that defines a point-to-point, "switched fabric" technology used to, among other things, increase the aggregate data rate between processor and storage resources of a server. The IBA is described in the *InfiniBand™ Architecture Specification Volume 1, Release 1.0.a*, by the InfiniBand Trade Association, Jun. 19, 2001, which specification is hereby incorporated by reference as though fully set forth herein. Broadly stated, the switched fabric technology may be embodied in a main component switch configured to receive data traffic (IBA packets) from one or more input ports and forward that traffic over one or more output ports to an IBA communications network. A switch fabric of the main component switch may interconnect a plurality of line cards, each of which may be configured to operate with one or more additional component switches, such as intelligent input/output (I/O) adapters or "peripheral" switches, having ports that provide, e.g., Fibre Channel or Gigabit Ethernet link connections to the network. In this configuration, the component switches cooperate to create an extended switch of an IBA switch fabric or subnetwork (subnet).

Where only a relatively few input and output ports are needed to receive and transmit data over the communications network at relatively low bandwidth/speeds, the network switch may comprise a single device or module. However, where a relatively large numbers of ports (e.g., 64–256) and a relatively high bandwidth per port (e.g., 2–10 gigabits per second) are desired, the switch may need a plurality of different modules (e.g., 8–16). The modules constituting such a "large" switch may be grouped into three categories: control modules (CM), line modules (LM) and switch modules (XM). The CM provides control and monitoring functions for the operation and health of the switch using communication paths to all other modules that typically operate at a lower bandwidth relative to the data paths through the switch. The LM provides standard format data connections to attach the switch to the network. The XM provides the actual switching function in a switch fabric to transfer data between all LMs in the switch.

One type of switch fabric is a crossbar fabric adapted to switch packets received over input connections to output connections of the XM. The crossbar fabric may be configured to switch variable-sized packets, or it may be configured to switch fixed-size cells, which are generally smaller than a typical packet size. Upon receiving a packet, an ingress (source) LM apportions that packet into some number of fixed sized cells and forwards those cells to the XM. The cell switch fabric on the XM "switches" the cells and forwards them to an egress (destination) LM, which then reassembles the cells back into the original packet and forwards the packet over the network.

All other quality functions being equal, a cell switch fabric is often less expensive to implement than a variable-sized packet switch and facilitates computation of the input-to-output connections. In addition, the cell switch fabric allows for better differentiation of quality of service (QoS) levels and achieves better utilization than the variable sized packet switch. Moreover, the cell switch fabric ensures "fairness" among the variable sized packets switched by the crossbar fabric. That is, because of the varying sizes of packets, use of a fixed-sized cell granularity ensures fairness among all packets received at the switch by enabling, e.g., interleaving of cells from large and small packets during the switching function. Packet segmentation and reassembly costs are easily offset by these benefits, such that a cell switch fabric is commonly used in networking equipment.

Many switches employ credits, grants, tokens, requests or other such signals to control the flow of cells or packets through the switch. For example, a first component may be configured to hold a cell or packet until it receives a credit indicating that the next component that is to receive the cell or packet has the capacity to do so. Each time a component moves or issues a cell or packet, moreover, a corresponding credit is consumed. In such systems, components are constantly exchanging credits. To operate at the speeds specified in the IBA specification standard, switch components must exchange large numbers of credits at high-speed. Under such conditions, it is not uncommon for one or more credits to be lost due to noise in the signal paths or to manufacturing defects in the components. Although it is less likely, these conditions can also result in credits being improperly gained. A "gained" credit refers to the detection of a credit being received, even though no component sent the credit. The loss or gain of credits can adversely affect the operating characteristics of the switch. For example, the loss of even one credit can cause delays in the switching of the cells thereby degrading the switch's performance.

Accordingly, a need exists to identify whether credits, grants, requests, tokens or other such signals are being lost or gained in a switch or other such device.

SUMMARY OF THE INVENTION

Briefly, the present invention is directed to a system and method for use in a high-speed data communication environment for determining whether certain messages, such as tokens, requests or grants, exchanged between a source module and a destination module are being lost or gained. In the illustrative embodiment, the system is utilized within a network switch, such as a switch configured to operate in accordance with the InfiniBand Architecture (IBA). The switch includes a plurality of Input/Output card (IOC) modules each of which provides a plurality of high-speed ports, a switch fabric card (SFC) that interconnects the IOCs and a switch control processor (SCP) that operates the SFC. In order to switch network messages, such as packets, received at a source IOC to a destination IOC, the source IOC issues a request to the SCP, which stores the request in request accumulators. The SCP includes a flow control and arbiter (FLARB) that examines the status of the request accumulators and issues grants to selected ones of the source IOCs allowing them to send packets, preferably apportioned into fixed-size cells, across the SFC to the specified destination IOCs.

In the illustrative embodiment, each IOC is provided with IOC consistency logic that is coupled to a request counter and to an IOC capture register. The FLARB is provided with FLARB consistency logic that is coupled to the request accumulators and to a FLARB capture register. As requests are issued by the IOC to the SCP, the IOC increments its request counter. Upon receiving the request from the IOC, the FLARB at the SFC increments its respective request accumulator. The FLARB decrements the request accumulator upon issuing a grant to the IOC. Upon receiving the grant from the FLARB, the IOC decrements its request counter.

To check for lost (or gained) requests and/or grants, the IOC consistency logic copies the current value of its request counter into its capture register and issues a consistency marker message to the FLARB at the SFC. Upon issuing the consistency marker, the IOC consistency logic continues to increment its request counter in response to sending additional requests to the SFC. It does not, however, increment the capture register in response to having issued additional requests. In response to grants received from the FLARB subsequent to the issuance of the consistency marker, the IOC consistency logic decrements both its request counter and the capture register. When the consistency marker is received at the SCP, the FLARB consistency logic copies the current value of its request accumulator into its capture register, and returns the consistency marker to the IOC. When the consistency marker is received back at the IOC, the IOC consistency logic stops decrementing its capture register in response to grants received from the FLARB. Nonetheless, the IOC continues to decrement its request counter in response to grants received after the return of the consistency marker.

Applicants have discovered that, by following this procedure, the value of the IOC's capture register, upon the return of the consistency marker to the IOC, will equal the value of the FLARB's capture register, provided that no requests and/or grants have been lost or gained. Accordingly, the SCP or some other management entity located either locally to the switch or remotely can asynchronously retrieve the contents of the two capture registers and compare their contents. That is, as neither capture register is modified following the return of the consistency marker to the IOC, the registers can be examined independently of each other and at any selected or convenient time. If the two values are the same, the management entity concludes that all requests and grants are being accurately received by the FLARB and the IOC, respectively. That is, no requests and/or grants are being lost or gained due to noise or other error. If the two values are not the same, indicating that requests or grants are being lost or gained, then the management entity can take appropriate action, such as issuing an error message or alarm, or causing the request counters at the FLARB or IOC to be adjusted appropriately.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
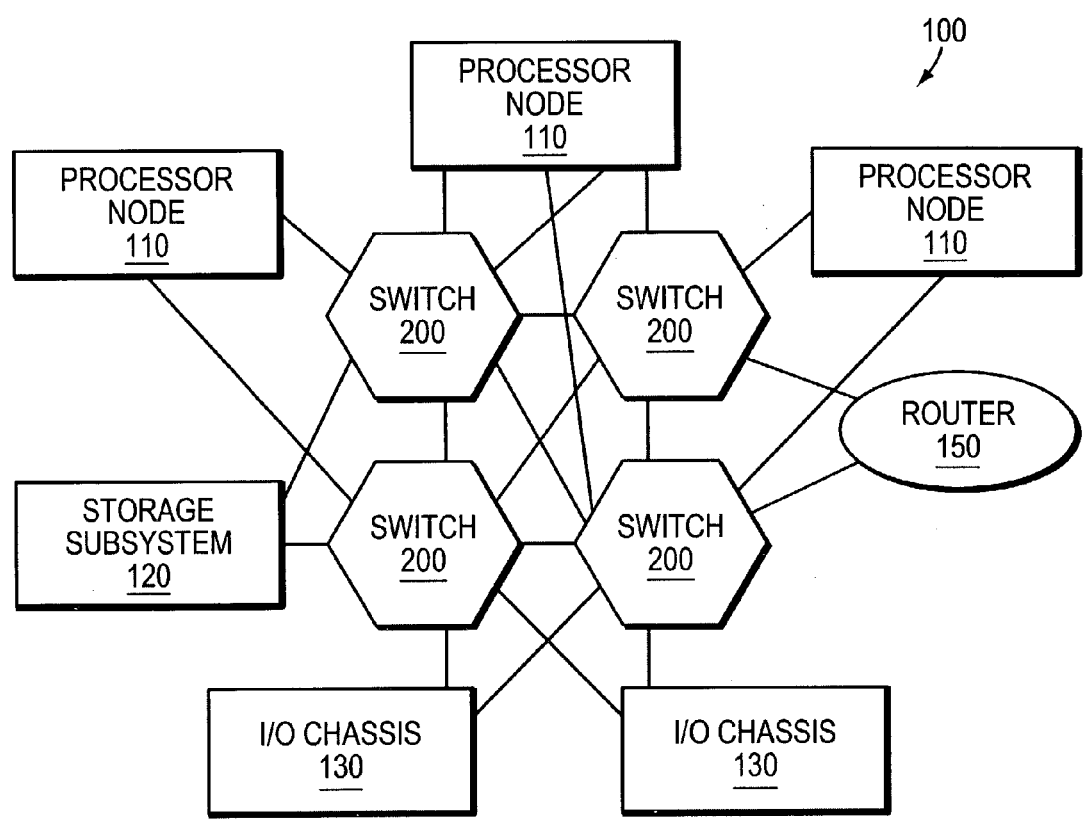
FIG. 1 is a schematic block diagram of a communications network that may be advantageously used with the present invention.

FIG. 1 is a schematic block diagram of a communications network that may be advantageously used with the present invention. The communications network is illustratively embodied as an InfiniBand Architecture (IBA) system area network 100 comprising a plurality of end nodes, such as processor nodes 110, a storage subsystem node 120 and input/output (I/O) chassis nodes 130, interconnected by intermediate network nodes, such as IBA router 150 and IBA switches 200. The nodes typically communicate by exchanging discrete packets of data according to predefined protocols. In this context, a protocol consists of a set of rules defining how the nodes interact with each other. For example, the nodes of IBA network 100 communicate by exchanging IBA packets. An IBA packet is an indivisible unit of IBA data transfer and routing consisting of one or more headers, a packet payload and one or more cyclic redundancy checks (CRCs).

Each processor node 110 includes at least one central processing unit (CPU), a memory and at least one host channel adapter (HCA) coupled to a switch 200. The storage subsystem node 120 comprises a collection of storage devices organized in, e.g., a redundant array of inexpensive disks (RAID) configuration, and is connected to a switch 200 via a target channel adapter (TCA). Each I/O chassis node 130 comprises a collection of I/O modules adapted to provide connectivity to I/O devices and/or other computer networks, such as the Internet, coupled to, e.g., Fibre Channel and/or Gigabit Ethernet links.

The IBA router 150 is a device that transports IBA packets between subnets of the network. A subnet is a set of IBA ports and associated links that have a common subnet identifier (ID) and are managed by a common subnet manager. An IBA switch is an intermediate network device that forwards IBA packets from one link to another of the same subnet, using, among other things, contents of a destination local identifier (DLID) field in a local route header of the packet.

Network Switch

Figure 2:
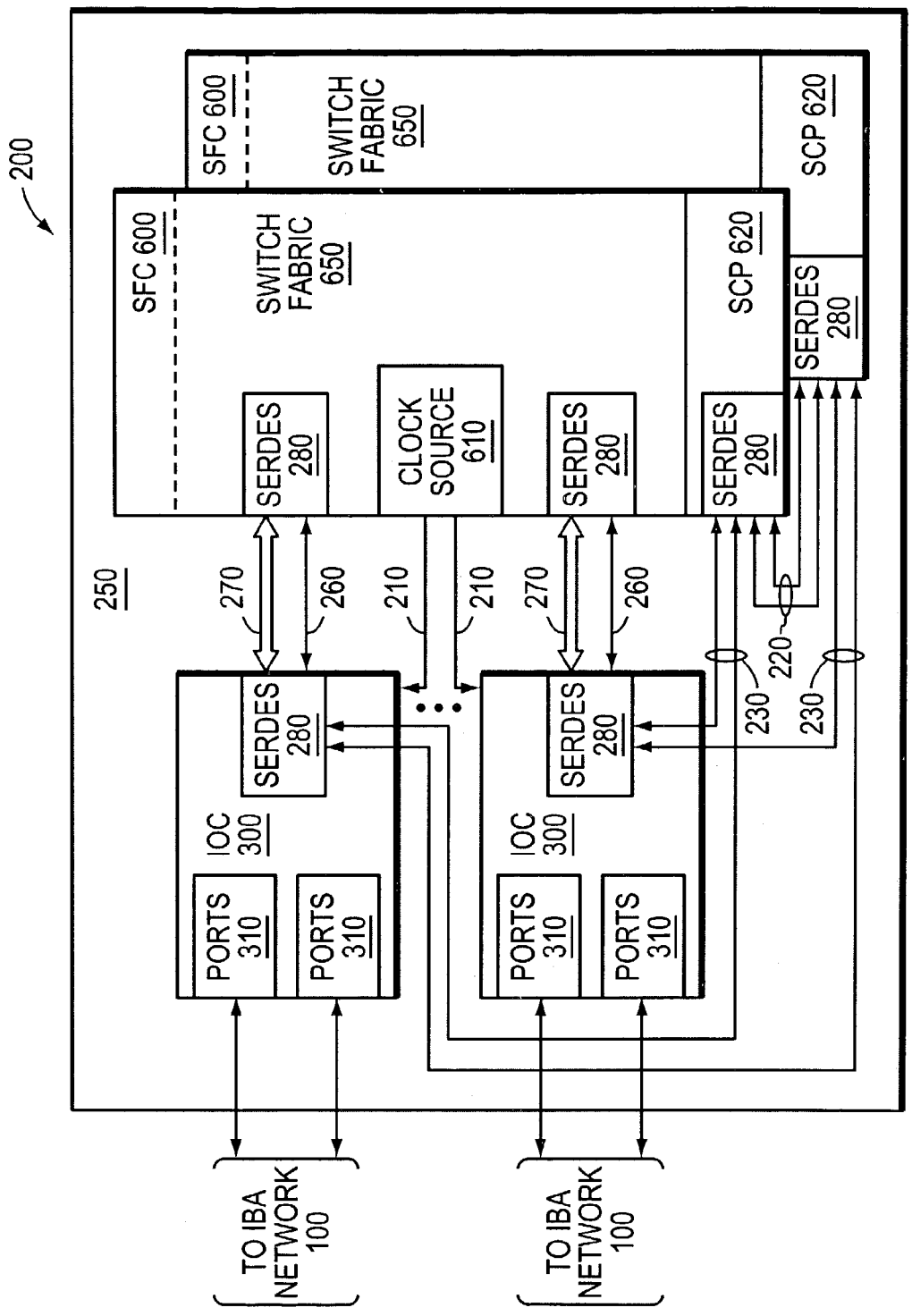
FIG. 2 is a schematic block diagram of a network switch having a plurality of input/output card (IOC) modules coupled to a switch fabric card (SFC) module.

FIG. 2 is a schematic block diagram of an IBA switch 200 including a plurality of line card or input/output card (IOC) modules 300 and switch fabric card (SFC) modules 600. An example of an IBA switch (hereinafter "switch 200") that may be advantageously used with the present invention is the Director Switch available from InfiniSwitch Corporation, Westborough, Mass. The switch 200 illustratively includes eight (8) IOC modules 300 that connect the switch to the IBA network 100 and two (2) SFC modules 600. Each SFC module 600 contains a switch control processor (SCP) 620 and a switch fabric 650 organized as a crossbar switch to interconnect data paths between the IOC modules 300 of the switch. Each SFC module 600 also contains a central clock source 610 that distributes clock signals over radial clock lines 210 throughout the switch for use by logic on the modules. However, it will be apparent to those skilled in the art that other clock distribution methods, such as asynchronous clocking, may be used.

In the preferred embodiment, both SFC modules 600 are functional and used during normal operation of the switch. The SFC modules 600 and their co-resident SCPs 620 cooperate in a redundant arrangement to provide full connectivity and control for the switch 200 in the event of a failure to either module 600. To that end, the SCP 620 on each SFC module 600 communicates with its redundant SCP 620 over paths 220 to ensure the on-going proper operation of each SFC module 600. In the event of a failure, the surviving SFC module assumes switching responsibilities to provide continuous, yet degraded, operation of the switch 200.

Each IOC 300 has one or more IBA ports 310 for connecting the switch 200 to the IBA network 100. Although eight IOC modules 300 are illustratively described herein, the configuration of the switch 200 may be scaled to accommodate additional, e.g., thirty-two (32), IOCs.

The IBA defines a number of different link bit rates. The lowest bit rate of 2.5 gigabits per second (Gbps) of data is referred to as a times one (1×) link. Other link rates are 10 Gbps, referred to as times four (4×), and 30 Gbps, referred to as times twelve (12×). Each IOC module 300 includes eight (8) 1× IBA ports 310, wherein each port accommodates 2.0 Gbps of data. Specifically, 2.5 Gbps of information are received/transmitted by a port 310, of which 2.0 Gbps are raw data with the remainder comprising encoding overhead. Therefore, 16 Gbps of data traffic flow are passed through the "ingress" portion of an IOC 300, forwarded to the SFC module 600 and switched to the "egress" portion of IOCs.

Such large amounts of traffic are not easily transported over parallel buses of a backplane. Given that, the switch 200 preferably employs serializer/deserializer (SERDES) devices 280 to limit the number of physical wires constituting a backplane 250 of the switch 200. At the interface between the IOC modules 300 and the backplane, these SERDES devices 280 convert parallel data to serial data for transmission over high bandwidth serial links of the backplane 250 to the SFC module 600. Corresponding SERDES devices 280 located at the interface between the SFC module and backplane reconvert the serial data to parallel data for processing on the module.

Serial data transported throughout the switch is converted to parallel data on each module primarily because of the use of field programmable gate array (FPGA) devices that are configured to operate with parallel data. Specifically, each SCP 620 is coupled to each IOC 300 in the switch over a 781.25 megabit per second (Mbps) serial link 230. Each SCP 620 further communicates with its redundant SCP counterpart over two 10 Mbps Ethernet links 220. Data links 270 couple each SFC 600 to each IOC 300, wherein each data link 270 preferably represents a bundle of four (4) 3.125 gigabit per second (Gbps) serial data links. As described herein, grant/request/flow control signals flow over 3.125 Gbps control links 260 between each IOC 300 and each SFC 600. That is, requests for arbitration are passed over these serial control links 260 by IOCs to the SFCs and grants are returned by the SFCs to the IOCs over the links 260. In addition, flow control information provided by output queues of the IOCs to input queues of the IOCs flow over the serial links 260.

IOC Module

Figure 3:
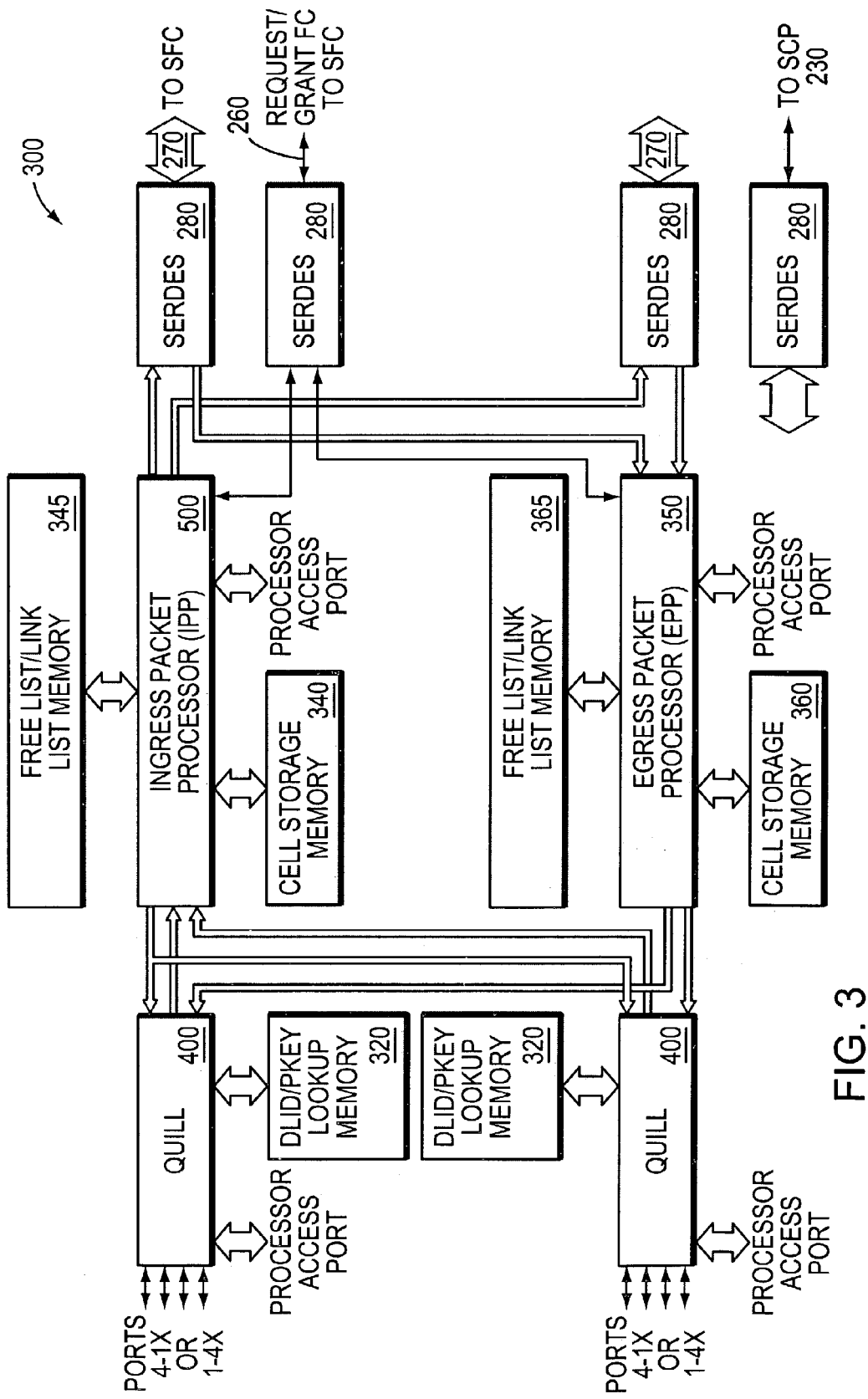
FIG. 3 is a schematic clock diagram of an IOC module having a Quad InfiniBand Link Layer (QUILL) interface device and an Ingress Packet Processor (IPP) that may be advantageously used with the present invention.

FIG. 3 is a schematic block diagram of an IOC module 300 that is partitioned into egress and ingress paths for transmitting and receiving packets to and from the IBA network 100. Broadly stated, the ingress path of each IOC comprises logic that "understands" the format of packet bits received over IBA network links, along with logic that examines headers of the packets and places those packets onto queues that are scheduled for servicing by the crossbar switch fabric. The egress path of each IOC comprises logic configured to receive a stream of packet cells from the ingress path of an IOC and reassemble those cells into a packet for transmission from the switch. Notably, an ingress path on a particular IOC must utilize the switch fabric 650 to send information to its own corresponding egress path.

The IOC 300 comprises an egress packet processor (EPP) 350 and an ingress packet processor (IPP) 500 that cooperate with a plurality of Quad Infiniband Link Layer (QUILL) interface devices 400 to provide egress and ingress buffering and queuing systems for the egress and ingress paths, respectively. As described above, a plurality of SERDES devices 280 are provided to translate data from parallel to serial (and serial to parallel) formats for transmission (and processing) throughout the switch. The QUILL devices 400 also form IBA link interfaces between IBA ports 310 of the IOC module 300 and the IBA network 100. There are preferably two QUILL devices per IOC, and each QUILL 400 is configured to operate with one or more physical device interfaces, such as a TCA that provides, e.g., Fibre Channel or Gigabit Ethernet, link connections to the switch. However, native IBA links can also be coupled to the switch via each QUILL.

Figure 4:
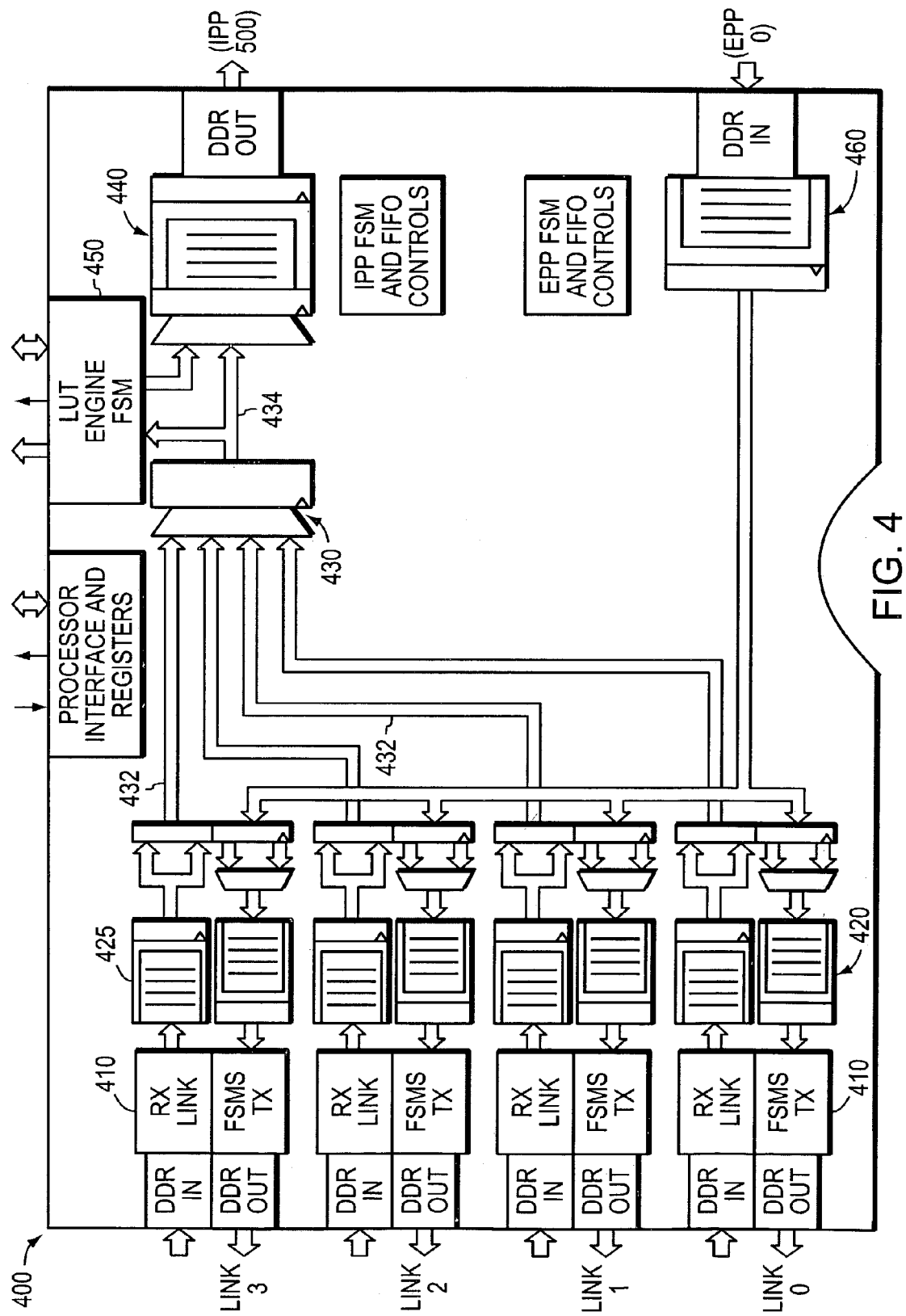
FIG. 4 is a schematic block diagram of a QUILL interface device.

FIG. 4 is a schematic block diagram of a QUILL 400 comprising a link function that provides IBA layer 2 operations for each data flow entering the IOC. The link function includes state machine and look-up engine logic that cooperate to provide a look-up operation on an IBA packet received at the IOC to identify a storage location within the ingress buffering and queuing system of the IOC. Each QUILL comprises a plurality of, e.g., four, link finite state machines (FSMs), each coupled to a link/port serviced by the QUILL. The link FSMs are connected to a buffering system 420 comprising a plurality of first in/first out (FIFO) buffers 425.

An ingress path of the QUILL comprises a receiver (Rx) FSM 410 or "deframer" that performs error checking and CRC checking on IBA packet data received from the IBA network 100. An ingress portion of the FIFO buffering system 420 is configured to store the packet data and forward that data to inputs 432 of a selector circuit 430. An output 434 of the selector circuit 430 is coupled to a double data rate (DDR) bus system 440 arranged to pass the data to the IPP 500. In addition, the Rx FSM 410 extracts headers from the received packets to perform lookup operations into a lookup memory 320 (FIG. 3) using DLID and protection key (PKEY) index values of the headers in connection with a lookup table (LUT) engine FSM 450. When a packet is received over an IBA port 310 of the switch, the QUILL 400 performs a lookup operation into memory 320 using the DLID/PKEY index values. As a result of the lookup operation, the DLID/PKEY index values are translated to a virtual output queue (VOQ) in the ingress buffering and queuing system. The QUILL 400 then forwards the received packet to the IPP 500 on the ingress path.

Figure 5:
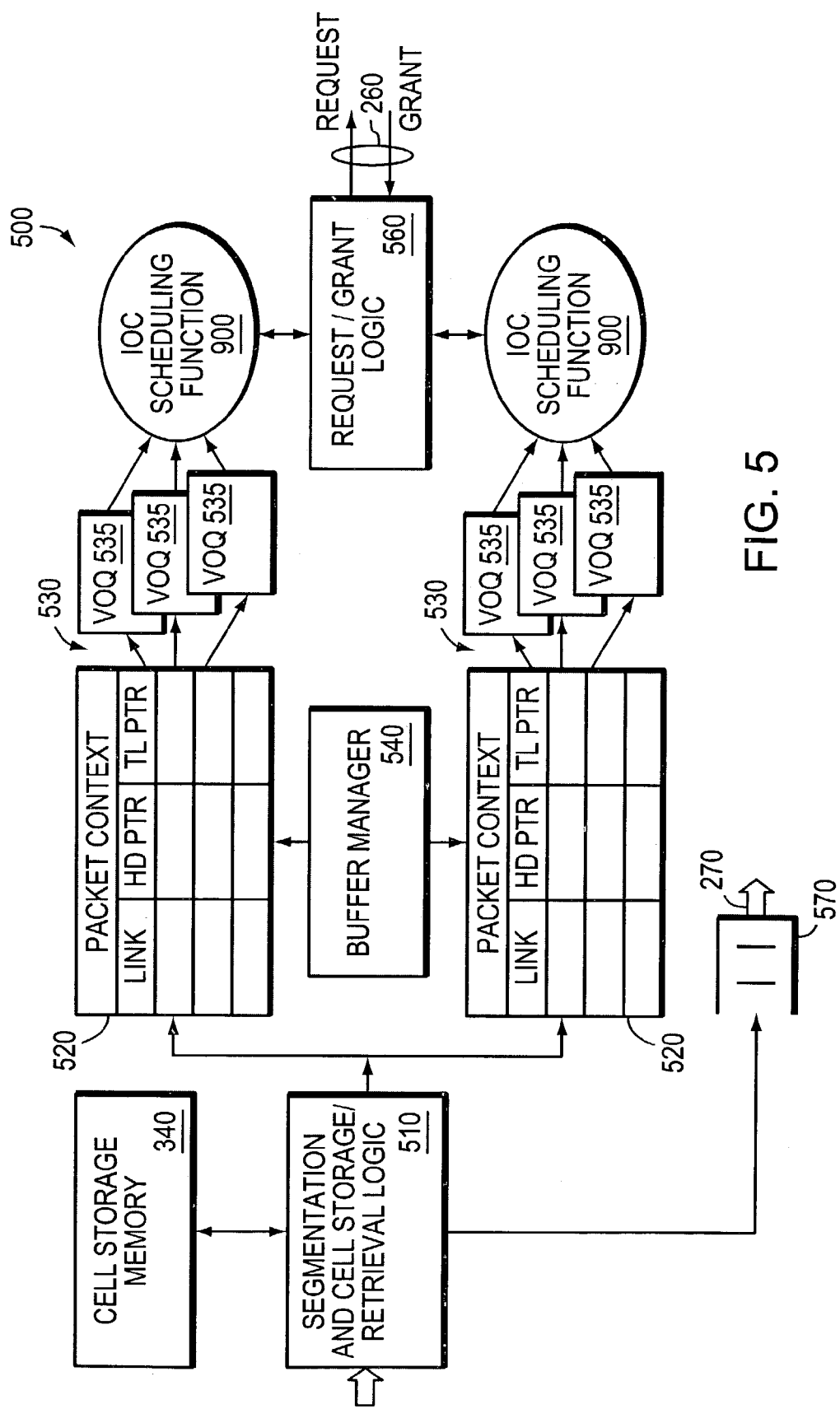
FIG. 5 is a schematic block diagram of an IPP.

FIG. 5 is a schematic block diagram of the IPP 500 comprising logic 510 configured to segment and store a received packet as fixed size, 64-byte cells. The 64-byte cell size is reflective of a credit used in flow control for the IBA and comprises 60-bytes of data and 4-bytes of header information that is internal to the network switch (i.e., not IBA header information). Each packet is characterized as a data flow based on the IBA input port 310 at which the packet is received at the IOC 300. The sizes of packets that are apportioned into data cells vary, according to the IBA, from 20-bytes to 4096 (4 k) bytes.

The packet data flow is segmented into the fixed size cells and stored in an external ("off-chip") ingress cell storage memory 340 (FIG. 3). Those stored cells are then enqueued onto the VOQs 535 of a queuing system 530. Specifically, the IPP 500 maintains a free list of 64-byte buffers 345 (FIG. 3) that are linked together to form a linked list of cells of a packet context 520. A packet context is an internal (i.e., within the switch) representation of a flow of cells associated with a packet. Once the linked list is formed, a head of the list is linked onto a VOQ 535 for transmission over the switch fabric 650.

Buffering and queuing on the ingress path is based on a destination output virtual lane (VL) and output port. A VL is defined by the IBA as a basis for link-to-link flow control. Each IB link preferably has 16 defined VLs; one VL is used for management traffic and the remaining 15 VLs are used for data traffic. The virtual lane concept has a significant role with respect to credits and congestion among switches in an IBA network. The IBA specification allows the notion of a VL to be mapped to different numbers from one link to another.

Specifically, the ingress queuing system 530 of the switch is organized into VOQs 535 that are dependent upon the VLs and output ports on each IOC 300 in the switch 200. Thus, each VOQ is associated with an output VL and an IBA output port 310. Notably, there is a distinction between an input VL and an output VL, and the IBA specification provides a translation process for translating an input VL to an output VL. In the illustrative embodiment, each IOC 300 has 64 input ports 310 with 16 VLs per port for a total of 1024 VOQs that are identified by the QUILL 400 (FIG. 4) and loaded by buffer manager logic 540 with cells destined for switching at the switch fabric. The VOQs are scheduled for servicing in the switch according to an IOC scheduling algorithm.

The IPP 500 also includes two scheduling functions 900 that enables each IOC to arbitrate for access to the switch fabric 650 in order to transfer data. A "sticky" packet policy is illustratively used for scheduling cells on the VOQs for transfer through the switch. The sticky policy is implemented on a per-switch port basis and allows an ingress path of a source IOC to have N packets in process at a time (interleaving cells to the SFC), where N equals the number of switch ports (and also the number of IOCs). For a given ingress path-to-switch port path, the packet is "sticky", i.e., the ingress path will not interleave cells from multiple packets to the same destination switch port.

Specifically, once a decision has been made to transfer data to a switch port of the switch fabric from a VOQ 535 on an IOC 300, the packet "stored on" the VOQ is exhausted (i.e., is "run" to completion) prior to transferring data from another VOQ to the same destination IOC. Each IOC then transfers cells stored in the memory 340 through buffer 570 and over data path 270 to the switch fabric. Cells from source IOCs may be interleaved for switching to different output queues of destination IOCs in the switch. Although one source IOC may send cells from one packet at a time through a switch fabric to each possible destination IOC, switched cells may be collected from multiple source IOCs at destination IOCs.

In sum, the indivisibility of work performed by an IOC 300 when sourcing packets to destination IOCs is as follows. A source IOC may send streams of cells through is the switch fabric 650 to multiple destination IOCs as disciplined by arbitration occurring in the switch. A particular source IOC sends a contiguous stream of packet cells over a particular VL to a particular destination IOC. Interspersed with that cell stream may be another contiguous stream of packet cells to another destination IOC. Therefore, the source IOC may interleave cells from multiple packets as they are switched through the switch fabric; however, to any particular destination IOC, the source IOC only sends contiguous cells of a packet.

Each destination IOC maintains separate contiguous streams of packet cells from each different source IOC on the basis of output VL/output port, i.e., VOQ. Because of this arrangement, a cell-level arbitration is centralized at the switch fabric, whereas the IOCs participate in an IOC-level arbitration in a distributed manner to maintain the contiguous packet discipline on the basis of destination IOCs. Therefore, the arbitration mechanism in the switch is essentially 2-staged, wherein a centralized cell level arbitration occurs at the switch fabric and a distributed VOQ/IOC level occurs at the IOCs. As described further herein, IOC arbitration occurs in parallel with the centralized, cell based arbitration function performed by an arbiter core of the SFC module 600 in response to requests generated by each IOC.

Since the IBA defines credit based flow-control, buffer utilization in the switch 200 is monitored by an upstream node (such as another switch 200) within the IBA network 100. Within an IOC 300, credit information ("credits") flows from the IPP 500 back to each QUILL 400. In response, each QUILL 400 generates a link packet using the credits received from the IPP and forwards that packet back to a transmitting node from which a previous packet was received at the switch. The credits contained in the link packet indicate to the transmitting node whether there are sufficient buffers (credits) for that node to send another packet. This is essentially an extension of credit flow from inside the switch to the external IBA link.

Flow control has a major role in the scheduling of VOQs on each IOC. Although the IOC includes output queues, the architecture of the switch is primarily directed to an input buffering and queuing system. A goal of the switch is to keep the output queues as shallow as possible. In addition, flow control in the switch is configured to convey flow control information from output ports back to input ports of the switch; this is a reason for the difference between input and output VLs. That is, information is fed back from each egress portion of an IOC, i.e., each output port or each output VL, back to the ingress path of each IOC to effect arbitration and the manner in which cells are forwarded through the switch, as described further herein.

The EPP 350 comprises logic configured to receive and process a stream of cells switched by the switch fabric 650. The EPP 350 resides on the egress path of each IOC and comprises one output queue for each output VL for each output port on the IOC. In the illustrative embodiment, there are eight (8) output ports with 16 output VLs per port for a total of 128 output queues on each egress path of the IOC. The stream of cells is stored in selected buffers of cell storage memory 360 (FIG. 3) until the cells are linked in a particular context for transmission from the switch over an egress link. As interleaved cells are received at the IOC from a switch port of the fabric, as many as eight (8) contexts (one from each IOC) are controlled by the EPP 350.

The EPP 350 manages reassembly of cells into a packet context 520 using cell storage memory 360 and free list/link list memory 365, as described with the IPP 500. The cells of packets are fully stored in the cell storage memory 360 until they are selected for transmission over the egress link as a packet. The selected packet is then transferred from the EPP 350 to the QUILL 400, where it is forwarded over egress links of the switch. Referring again to FIG. 4, a packet context is received over a DDR bus system 460 from the EPP 350 and forwarded over an egress path of the QUILL. The packet context flow over the egress path through an egress portion of the FIFO buffering system 420 to a transmitter (Tx) FSM 410 or "framer". From there, the packet is forwarded over egress links of the switch 200.

SFC Module

Figure 6:
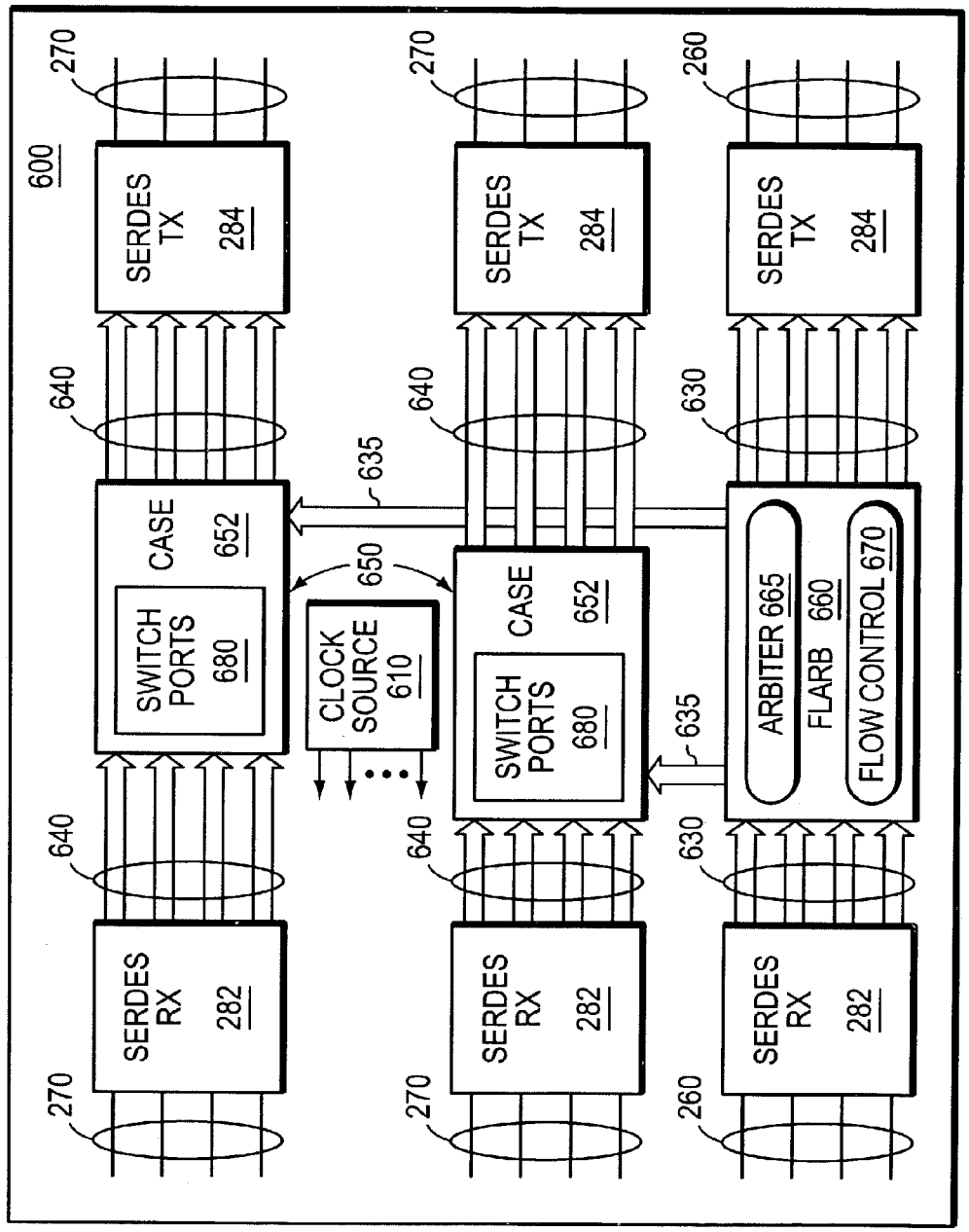
FIG. 6 is a schematic block diagram of an SFC module comprising a crossbar switch fabric that may be advantageously used with the present invention.

FIG. 6 is a schematic block diagram of the SFC module 600 comprising a clock source 610 and a switch fabric 650 configured to operate on fixed-size cells transferred by IOCs to the SFC over high-speed serial communication paths of the switch. The switch fabric 650 interfaces to the IOC modules 300, a flow control and arbiter (FLARB) device 660 and various SERDES devices. The switch fabric 650 illustratively comprises two 10×10 cell alignment and switch engine (CASE) 652 crossbar devices coupled to receive (SERDES Rx) 282 and transmit (SERDES Tx) 284 devices that translate data from serial to parallel (and parallel to serial) formats. The FLARB 660 comprises a flow control mechanism 670 and a central arbiter 665 that controls both CASE devices 652 on the SFC 600 to keep them, among other things, in synchronization.

Operationally, each IOC 300 sends a request over a control link 260 to the arbiter core 665 embodied on the FLARB device 660. The SERDES Rx device 282 receives data over a plurality of (e.g., four) high-speed serial data links 260 and transposes it to data over a parallel bus 630 operating at a lower frequency that can be handled by conventional FPGA logic. In particular, the SERDES device 282 translates serial data into parallel data and forwards that data to the arbiter 665, which implements a conventional SLIP arbitration algorithm. The arbiter 665 renders a decision based on all the requests received from all the IOCs and resolves any conflicts that may arise. In response, the arbiter issues grants over bus 630 that are converted by the SERDES Tx device 284 for transmission over control links 260 to the IOCs. At the same time, the FLARB 660 issues configuration information to each of the CASE devices 652 over independent control lines 635 between the CASE 652 and FLARB 660 devices.

The configuration information comprises control information in the form of a vector that instructs each crossbar device 652 to connect an input switch port to an output switch port of the switch fabric at a particular time. The configuration information essentially synchronizes the switch such that ingress source IOCs transmit cells to the switch fabric 650 over serial links 270 for transmission to egress destination IOCs. Since the switch is based on synchronous switching, all arbitration, data transmission and switching aspects of the crossbar devices 652 must be synchronized across those serial links, which are thereafter transposed into parallel links 640. The cells switched by the SFC 600 are then forwarded to the EPPs 350 of destination IOCs 300.

Crossbar Synchronization

At SERDES receiver logic (e.g., SERDES Rx devices 282), which is coupled to the high-speed links of the backplane 250, serial data is converted to parallel data for processing on each of the modules. Transmission of information over the high-speed serial links is synchronous and lossless; that is, when a bit is converted to serial data it is reliably transmitted at high-speed over the backplane 250. However, when the SERDES receivers convert the serial information stream to a parallel information, there is no guarantee that the converted parallel information is synchronized across the various SERDES Rx devices. This is particularly evident when the serial path from one source IOC to the SFC 600 is of a different length than the serial path from another source IOC to the SFC, as well as when there are different implementations and vendors of the SERDES devices.

Therefore, information received at the SFC 600 from source IOCs of the switch cannot be synchronously organized using only SERDES receiver logic. That is, additional techniques are needed to achieve synchronization using the SERDES devices. In this context, synchronization denotes alignment of cells for switching at the SFC. As noted, the switch fabric 650 of the SFC 600 is preferably organized as a crossbar switch and, accordingly, requires synchronized switching of data, particularly for information transmitted as fixed size cells through the switch. Synchronized switching, in this context, preferably takes place within a defined cell interval or cell time.

Since the serial links are lossless, bits of information transmitted at a predetermined frequency over a high-speed link are received at a SERDES receiver at the exact predetermined frequency without bits added or lost. Although the serial links in the switch illustratively operate at the same frequency, asynchronous links, as noted, may alternatively be used. The central clock source 610 on the SFC 600 radially distributes clock signals to all IOCs (and the SFC) of the switch. These clock signals are used to control the operation of logic circuitry, including the SERDES devices, on all modules of the switch. Therefore, the entire switch preferably operates relative to a single clock frequency.

However, phase variances introduced by differing serial link lengths between IOCs and the SFC effectively disrupt synchronization among the SERDES receivers on the modules. Even though all the links operate at the same frequency, cells arriving at the SFC for switching may be misaligned in phase. In addition to these differing etch lengths, a source of these phase variants on the modules may include receiver recovery logic, e.g., FIFO buffers, whose pointers may be offset due to the processing of serial data without a reference point. This results in cells arriving "out-of-phase" at the switch fabric.

For example, suppose a source IOC sends a request to the SFC for a cell time slot to send a data cell to a destination IOC. Similar requests are sent by other source IOCs at the same time and these requests are collected at the SFC. For every cell time at which it configures the crossbar devices to switch cells from their input ports to their output ports, the SFC considers all of these collected requests in connection with a cell-based arbitration policy executed by the central arbiter 665. In accordance with the arbitration policy, the arbiter 665 issues grants to those source IOCs that are allowed to send cells to destination IOCs. A grant essentially instructs the source IOC to send a cell at a particular cell time to a particular destination IOC. The source IOC retrieves the cell from its buffer and queuing system, and forwards it to the SFC where it is switched to the destination IOC.

The arbiter 665 preferably issues a set of grants to a set of source IOCs at each arbitration interval. This set of grants is tightly bound; that is, there is no mixture of grants from one set with grants from another set at another arbitration interval. All grants issued in a particular set during a particular arbitration interval are tightly bound and must be retired collectively prior to issuance of another set of grants. As with cell data forwarded by source IOCs to the switch fabric, the grants issued by the arbiter to the IOCs and the switch fabric logic must be tightly correlated and synchronized. Specifically, the cell data and its associated connection configuration information provided by the arbiter must be synchronized at the switch fabric by the time they are presented to the CASE devices 652. This ensures that proper connections are made through the crossbar fabric so that correct data is switched from the input switch ports to the output switch ports of the fabric at the proper time.

Figure 7:
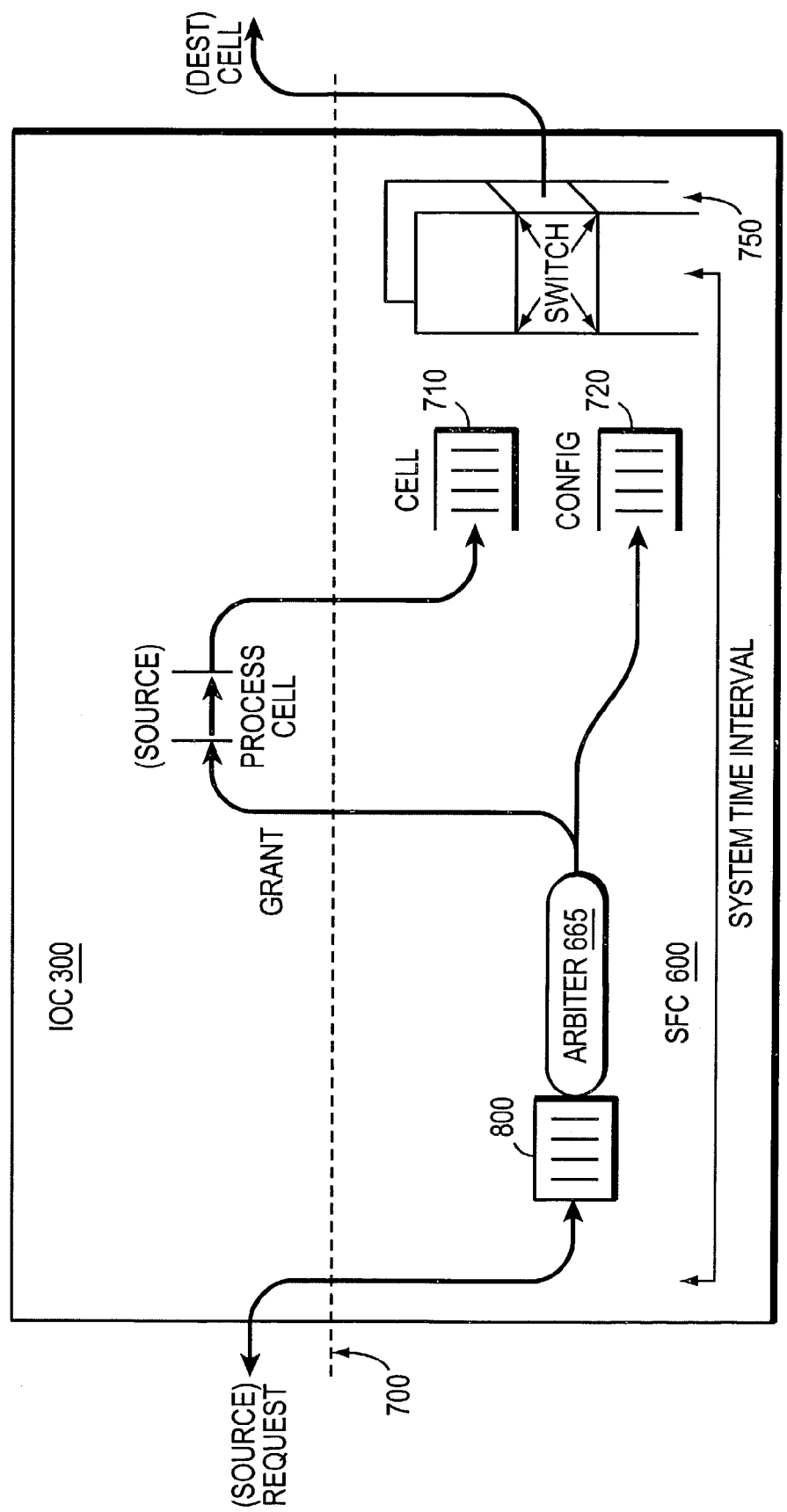
FIG. 7 is a diagram of a timeline illustrating a sequence of events that occur among a source IOC, the SFC and a destination IOC of the network switch of FIG. 2.

FIG. 7 is a schematic diagram of a time line 700 illustrating a sequence of events that occur among a source IOC, a SFC and a destination IOC as a result of requesting transmission of, granting such transmission of, and switching a cell through the switch fabric 650. The source IOC generates a signal (REQUEST) requesting transmission of the cell over a SERDES serial link to the SFC, where the signal is stored as a request in a request accumulator 800 (FIG. 8) from the source IOC to send data to a destination IOC. The arbiter 665 performs an arbitration function for the request and, as a result, generates a grant signal (GRANT) that is returned to the source IOC, essentially acknowledging its associated request for a particular cell time in the future.

In response, the source IOC retrieves the cell from its buffering and queuing system and forwards it over the SERDES link to the crossbar devices, where it is stored in a cell queue 710 for switching at the particular cell time. In addition, grant information (GRANT) generated by the arbiter on the SFC is sent to the crossbar devices and stored in a configuration queue 720 as configuration information indicating that, at the particular cell time, data received from this source IOC is to be switched to the destination IOC. When the particular cell time arrives, the configuration information is synchronized with the cell data provided by the source IOC and the data is switched through the crossbar devices to the destination IOC, which then transmits the data over the IBA network. All synchronization throughout the switch leads up to that particular cell time when the crossbar devices actually switch cells from source IOCs to destination IOCs.

In the illustrative embodiment, a cell time is 51.2 nanoseconds; this represents the time needed for any logic stage to operate on a cell as it is switched from a source IOC through the switch fabric to a destination IOC. The cell times occur contiguously and continuously in order to switch cells through the switch. The overall latency from the time a source IOC issues a request to transmit a cell to the time that the cell is actually switched to a destination IOC is substantial. To compensate for that latency, the entire process is highly pipelined and, thus, implemented as a synchronization pipeline 750 to ensure that a cell is switched through the fabric every cell time. The interval between generation of a request at a source IOC to actual switching of a cell through the switch fabric is referred to as a system time interval.

The actual cell time within which cells are switched through the switch fabric only occurs on the SFC and, in particular, on the CASE devices. The crossbar switch fabric 650 is basically constructed as a plurality of output switch ports 680 (FIG. 6), each having a selector with an input from each of the IOCs. These switch ports 680 are located on each CASE 652 and comprise input queues of cells received from each IOC and output queues of switched cells destined for the IOC. When configuring the switch fabric, each of these output switch ports is instructed to configure its selector to pass data from a particular input to its output at a particular cell time. Therefore, each CASE device further includes input queues for storing configuration information pertaining to grants generated by the arbiter 665 and associated with the input cells to be switched during the cell time. The configuration information generated by the centralized cell-based arbiter comprises the instructions provided to the selectors.

Each switch port includes an input cell FIFO that stores input cells received from a source IOC for switching through the crossbar switch fabric at particular cell times. The switch port also includes a configuration FIFO that stores configuration information received from the arbiter 665 pertaining to those input cells that will be switched at the cell times. These FIFOs are configured to synchronize the configuration information associated with each particular cell. That is, when the cell and its associated configuration information arrive at the heads of their respective FIFOs, the cell is passed from an input to an output of a selector for storage in an output cell FIFO. Storage of a cell in the FIFO thus denotes "switching" of the cell through the crossbar fabric to a destination switch port as indicated by the configuration information provided over line to the selector.

Arbitration

As noted, arbitration in the switch is performed by a two-staged arbitration mechanism comprising distributed queue-based arbitration at the IOCs 300 and centralized cell-based arbitration at the SFC 600. Cells are presented to the output switch ports 680 of the crossbar switch fabric 650 in a synchronous manner; accordingly, the configuration information needed to instruct the crossbar fabric as to the input-to-output connections required for those cells must also be presented in a synchronous fashion. The configuration information generated by the central arbiter 665 is preferably a vector comprising a plurality of bits, each representing an input to a particular selector of an output switch port 680. Assertion of a bit within the vector instructs the selector to select data on that corresponding input for presentation to the output of the selector at a particular cell time. Therefore, the central arbiter 665 generates a vector for each of the output switch ports 680 of the crossbar switch fabric 650 at each cell time.

The arbitration algorithm illustratively employed by the central arbiter is a two-iteration SLIP arbitration algorithm based on a conventional SLIP arbitration policy. The illustrative arbitration algorithm considers all input requests from source IOCs to switch cells at a particular cell time and decides which of those requests should be granted based on, among other things, the destination IOCs for that cell time. An intention of the algorithm is to utilize as many output ports as possible during the cell time.

As with the grants generated in response to requests, the central arbiter 665 generates the configuration information for a cell time (i.e., epoch) in the future. This vector of configuration information is presented to the logic of output switch port 680 and stored in the configuration FIFO. Synchronization logic within each output switch port then synchronizes the configuration information to its appropriate cell data so that switching through the switch fabric occurs at the correct time as per the above described synchronization scheme.

Assume the crossbar switch fabric 650 is configured with n inputs and n outputs. Each source IOC may send data to as many as n destination IOCs. Therefore, the switch fabric must actually accommodate $n^2$ request inputs. The central arbiter 665 thus receives $n^2$ inputs or requests from source IOCs but can only generate n outputs or grants in response to those requests because an output can only receive a cell from one input during a cell time. At each cell time, each source IOC forwards up to n requests, or tokens, to the central arbiter on the SFC, wherein each token represents a request by the source IOC to send a cell to a particular destination IOC. The token may be illustratively manifested as a bit within a frame message sent to the arbiter 665. The IPP 500 on each IOC 300 sends a frame (comprising n bits) every cell time over control path 260 to the central arbiter. Each of the n bits of a frame represent either a request (an asserted bit) or no request (non-asserted bit) to send a cell of data to each destination IOC during some future cell time.

The arbiter maintains $n^2$ accumulators (or counters) representing the $n^2$ request inputs that it may receive. Every time a source IOC sends a request to transmit a cell to a destination IOC, that request is recorded in an appropriate accumulator. For example, if IOC 0 issues a request to the arbiter 665 to send a cell to IOC 5, the $6^{th}$ bit of the frame generated by IOC 0 is asserted. Upon receiving the frame, the arbiter adds (increments) that request into an accumulator representative of one of the $n^2$ request inputs. If IOC 0 wants to send a data cell to more than one destination IOC, it asserts an appropriate bit of the frame for each of those destination IOCs and the central arbiter increments the appropriate accumulator for each request. The bits of the frame are asserted for only one cell time; that is, a frame is generated and sent to the central arbiter 665 over the control path 260 every cell time.

Figure 8:
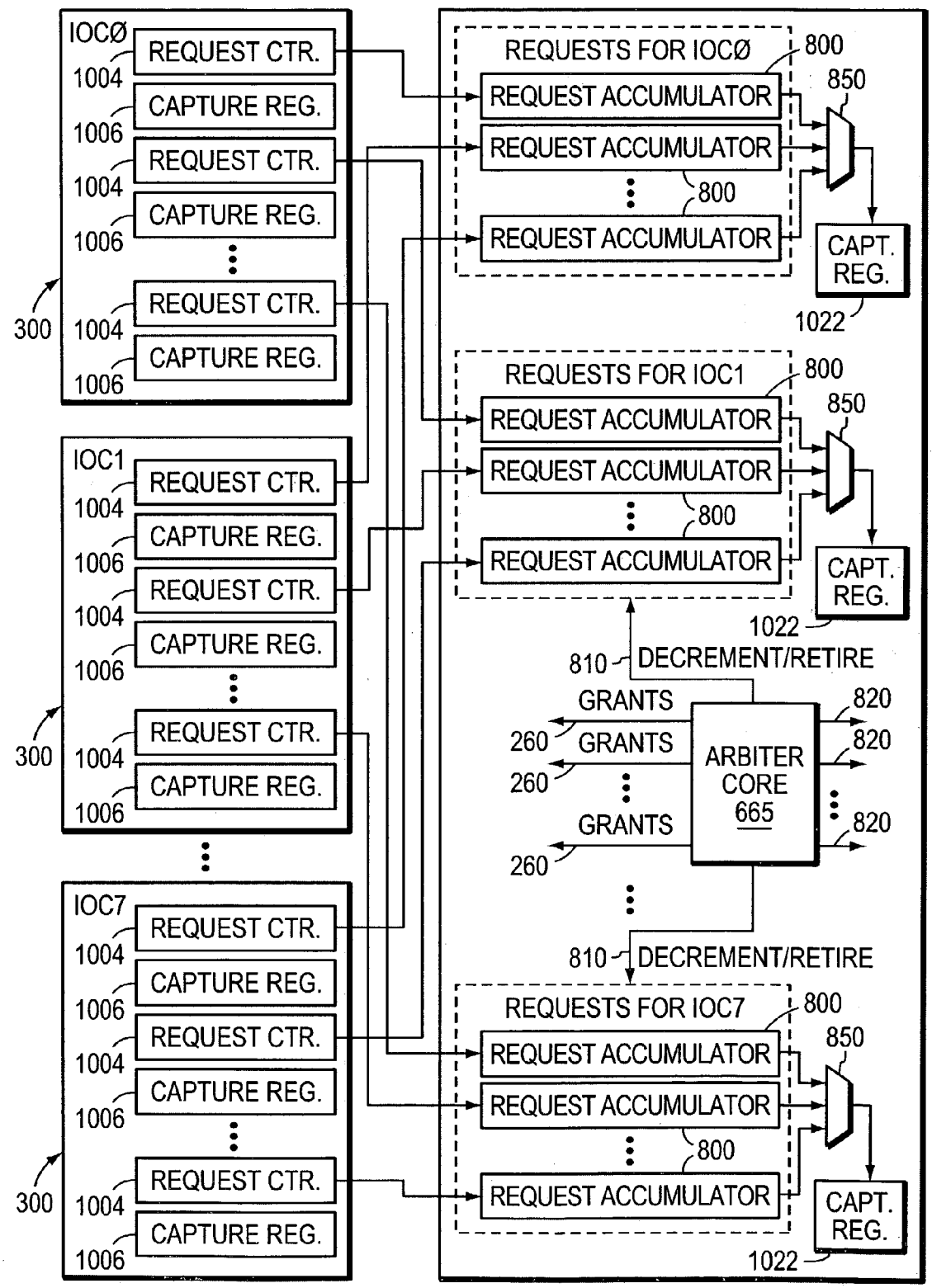
FIG. 8 is a schematic block diagram of a plurality of request accumulators disposed on the SFC.

FIG. 8 is a schematic, partial block diagram illustrating the request accumulators 800 disposed on the FLARB 660 and utilized by the central arbiter 665. In the illustrative embodiment, a series of request accumulators 800 are provided for each destination IOC 300, i.e., for each output switch port 680. Specifically, for each destination IOC 300, there is one request accumulator 800 for each potential source IOC. For example, for IOC0, there are eight (8) request accumulators 800, one for each potential destination IOC, i.e., IOC0 through IOC7. Each request from IOC0 can increment one or more of the request accumulators 800 associated with IOC0. In the illustrative embodiment, each IOC 300 limits the number of outstanding requests (i.e., requests that have yet to be granted) to send data to any destination IOC to a predetermined number, e.g., 15. In other words, a particular source IOC cannot make more than 15 unretired requests to any particular destination IOC. Those skilled in the art will recognize that other values (or no limit) may be utilized.

The arbiter 665 constantly monitors the state of each request accumulator 800 to determine whether a request is pending in that accumulator. One reason for monitoring the accumulators is because, if a request accumulator 800 shows a non-zero value, there may be a request pending in the accumulator. In the illustrative embodiment, a request is considered to exist in a request accumulator 800 when the accumulated value is "2" or greater, or is "1" and a grant was not just issued during this cell time. This is because a retirement of a grant is merely a decrement of a request accumulator. Another reason for monitoring the accumulators 800 is because the arbiter core 665 may be unable to arbitrate and render a decision for transmission into the synchronization pipeline 750 of the switch fabric 650 in one cell time. For example, the arbiter care 665 may require one and a half cell times to render its decision. Therefore, the decision rendering procedure of the arbiter core 665 is pipelined over two cell times.

In sum, the arbiter core 665 generates decrement signals over lines 810 used to retire outstanding requests in the request accumulators 800 and crossbar configuration vectors over lines 820 used to instruct selectors of the output switch ports 680 as to which inputs should be selected for output through the crossbar switch fabric 650. In addition, the arbiter 665 generates grant signals that are transmitted over lines 260 to source IOCs indicating which requests have been granted access for switching through the switch fabric.

In accordance with the present invention and as discussed in more detail below, each IOC 300 is provided with a plurality of request counters 1004, one for each potential destination IOC 300. Furthermore, associated with each of the request counters 1004 at the IOCs 300 is a corresponding capture register 1006. In addition, for each of the request accumulators 800 associated with a given destination IOC, there is a capture register 1022 at the FLARB 660. Each of the request accumulators 800 for a given destination IOC may be coupled to the respective FLARB capture register 1022 through a selector 850.

IOC Scheduling

Figure 9:
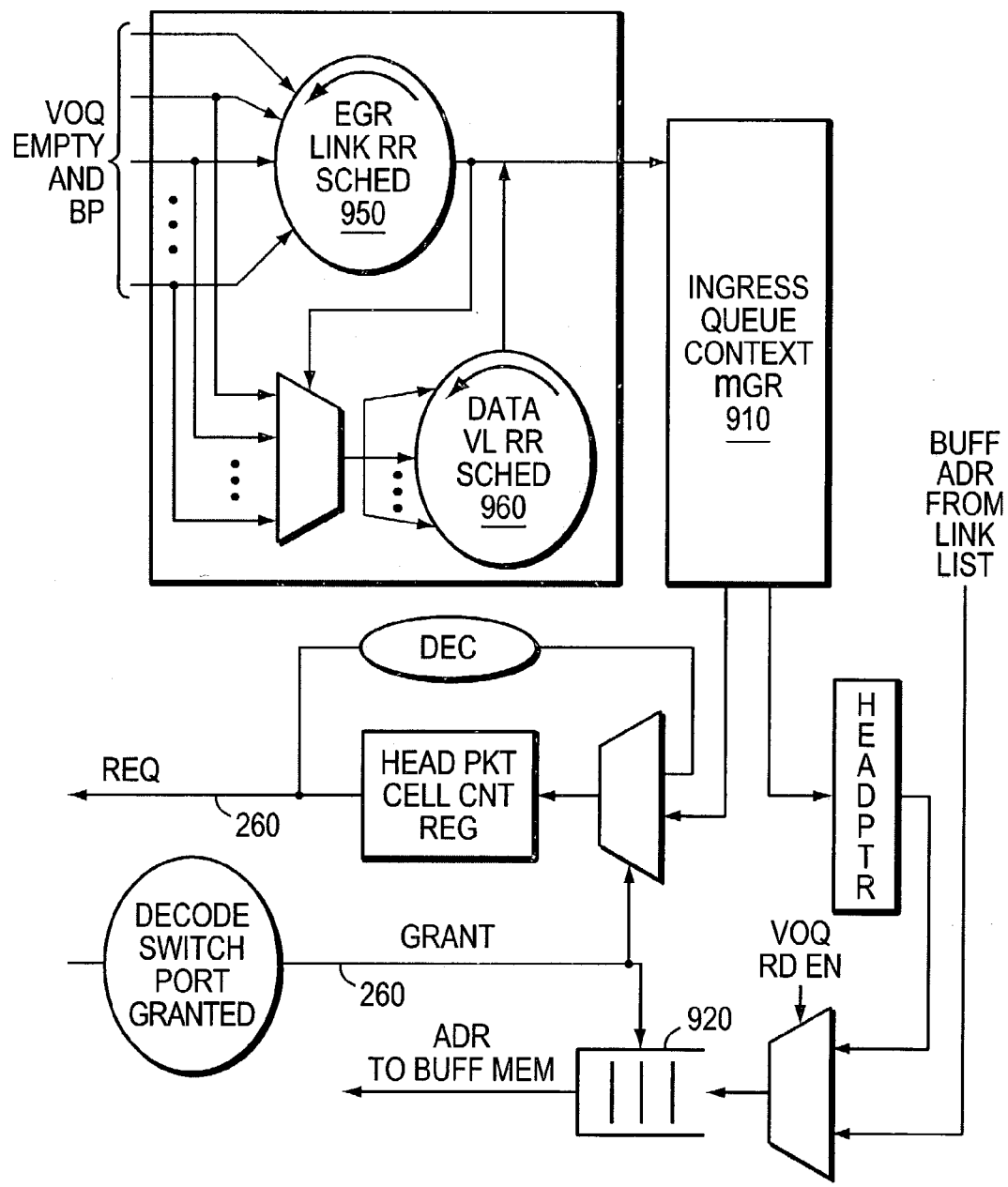
FIG. 9 is a schematic block diagram of the IOC scheduling logic.

FIG. 9 is a schematic block diagram illustrating the logic used to implement the IOC scheduling functions 900 on each IOC 300 of the switch 200. Note that the IOC scheduling function 900 described herein illustrates a scheduling function per output switch port 680 of the switch fabric 650. The result of the scheduling function is a request signal from an IOC 300 to the central arbiter 665 that requests transmission of a cell to a particular output switch port 680 and, possibly, a grant signal returned to the IOC 300 from the arbiter 665.

In the illustrative embodiment, scheduling on each IOC comprises two levels: a first level that considers the state of each VOQ 535 on the IOC 300 as represented by the following information: (i) whether there is "back pressure" (flow control) applied to that VOQ and (2) whether there is any data to send from that VOQ. Essentially, this first level of "egress link" scheduling 950 arbitrates among each of the VOQs and its corresponding egress VL link on the basis of that information. If the egress link is not back-pressured and there is data to send, then that VOQ/egress link is preferably serviced in a fair manner, e.g., a round robin policy among all qualified VOQs.

The result of the first level of IOC scheduling (i.e., selection of a particular VOQ) is provided to a second level of IOC scheduling for the output switch port to enable arbitration among all of the output VLs on the basis of the information used in the first level. The result of the second level of "data VL" arbitration 960 enables a queue context manager 910 to begin dequeueing cells of a packet from the selected VOQ of the ingress queuing system 530 and to prepare those cells for transfer to the switch fabric. In parallel with these activities, the queue context manager 910 cooperates with request/grant logic 560 (FIG. 5) to generate requests (preferably back-to-back), which are forwarded over control line 260 to the central arbiter core 665. In response to a request, the arbiter core 665 subsequently returns a grant over line 260 for that particular request.

During the time between transfer of the request and reception of the corresponding grant, pointers to buffers associated with packet cells of the selected VOQ are fetched and stored in a schedule buffer queue 920 waiting for the return grant from the central arbiter. When the grant signal is received at the IOC, the stored pointers are used to dequeue the corresponding data (packet cells) from the ingress cell storage memory 340 and that data is sent over the data path 270 to the switch fabric 650.

With such an "incremental request accumulation" scheme, it is difficult to recognize whether a request has been lost (or gained) in any one of the accumulators. For example, a bad data event, such as noise, over the control path 260 between an IOC 300 and the arbiter 665 may inhibit the arrival of a request from that IOC to an appropriate request accumulator 800. Furthermore, it may take some time before the source IOC realizes that the request was not received at the FLARB 660, resulting in degraded operation of the IOC as it experiences undue latency with respect to retiring that outstanding request.

The present invention is directed to an efficient system and method for detecting the loss or gain of requests and/or grants. Notably, the technique of the present invention introduces a special marker adapted to establish an invariant in time. This special marker is sent from a source IOC to the central arbiter core 665 and establishes a "snapshot" of one or more of the request accumulators 800 when it arrives at the FLARB device 660. Similarly, the marker is passed by the FLARB 660 over the control path 260 back to the source IOC, where it takes a snapshot at the IOC. A processor, such as SCP 620, can then retrieve the contents of registers at both the IOC and the FLARB device containing these "snapshots" and, if all is well, the same value should appear in both registers.

Figure 10:
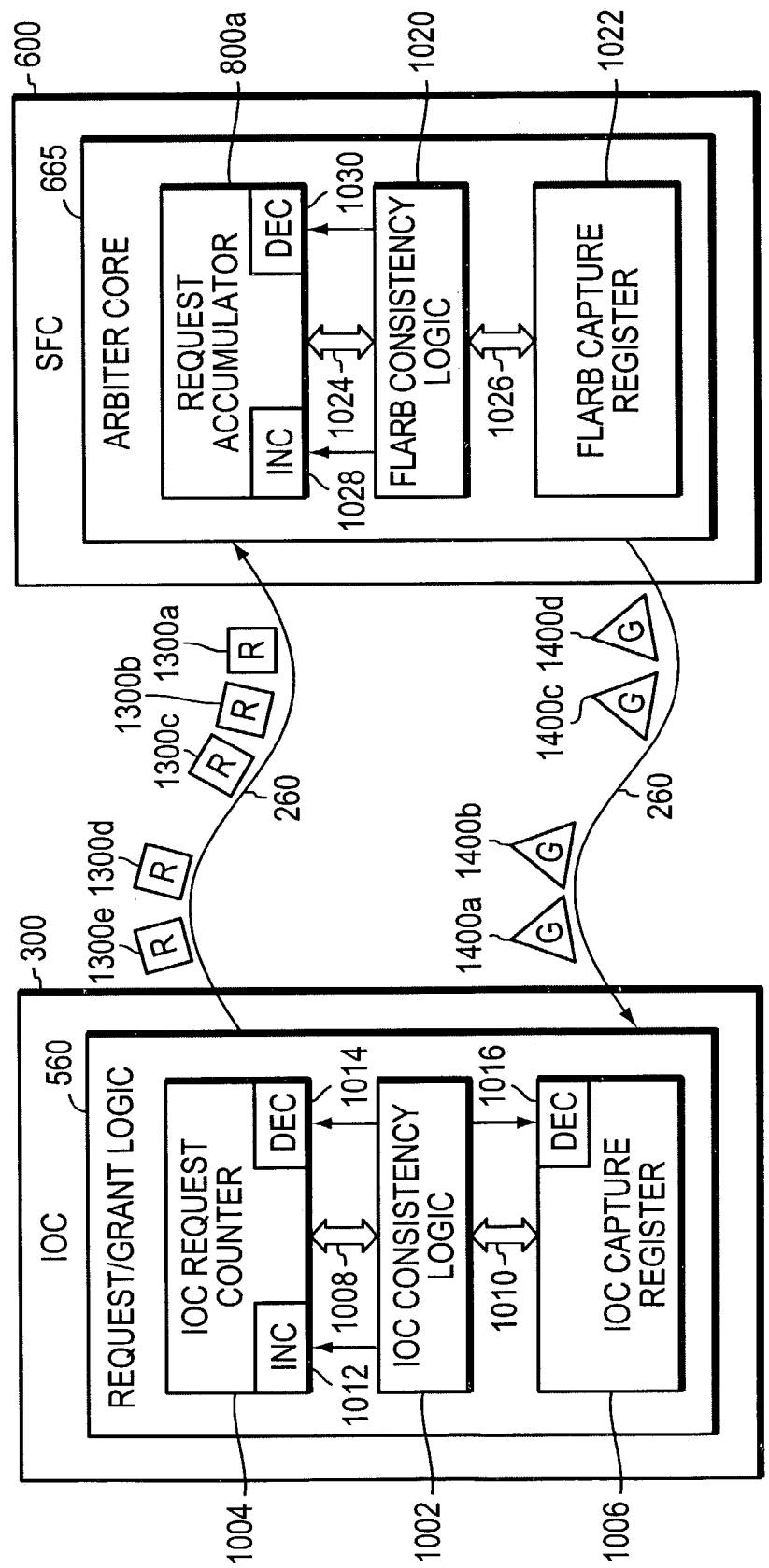
FIGS. 10–12 are partial, schematic diagrams illustrating the interaction between an IOC and an SFC in accordance with the present invention.

FIG. 10 is a highly schematic block diagram illustrating the interaction between the request/grant logic 560 of an IOC 300 and the arbiter 665 of an SFC 600. In accordance with the present invention, the request/grant logic 560 is preferably configured to include an IOC consistency logic circuit 1002 and, as mentioned above, one or more IOC request counters, such as counter 1004, and one or more IOC capture registers, such as register 1006. As described above, there is preferably a companion capture register 1006 for each request counter 1004. The consistency logic 1002 is operably coupled to both the request counter 1004 and the respective capture register 1006 so as to retrieve the contents of the request counter 1004 and load the retrieved contents into capture register 1006, as illustrated by arrows 1008 and 1010. In addition, the request counter 1004 can be incremented and decremented by the logic 560 and/or consistency logic 1002 as schematically illustrated by increment (INC) and decrement (DEC) buttons 1012 and 1014. The capture register 1006 can be decremented by the consistency logic 1002 as schematically illustrated by decrement (DEC) button 1016.

Figure 11:
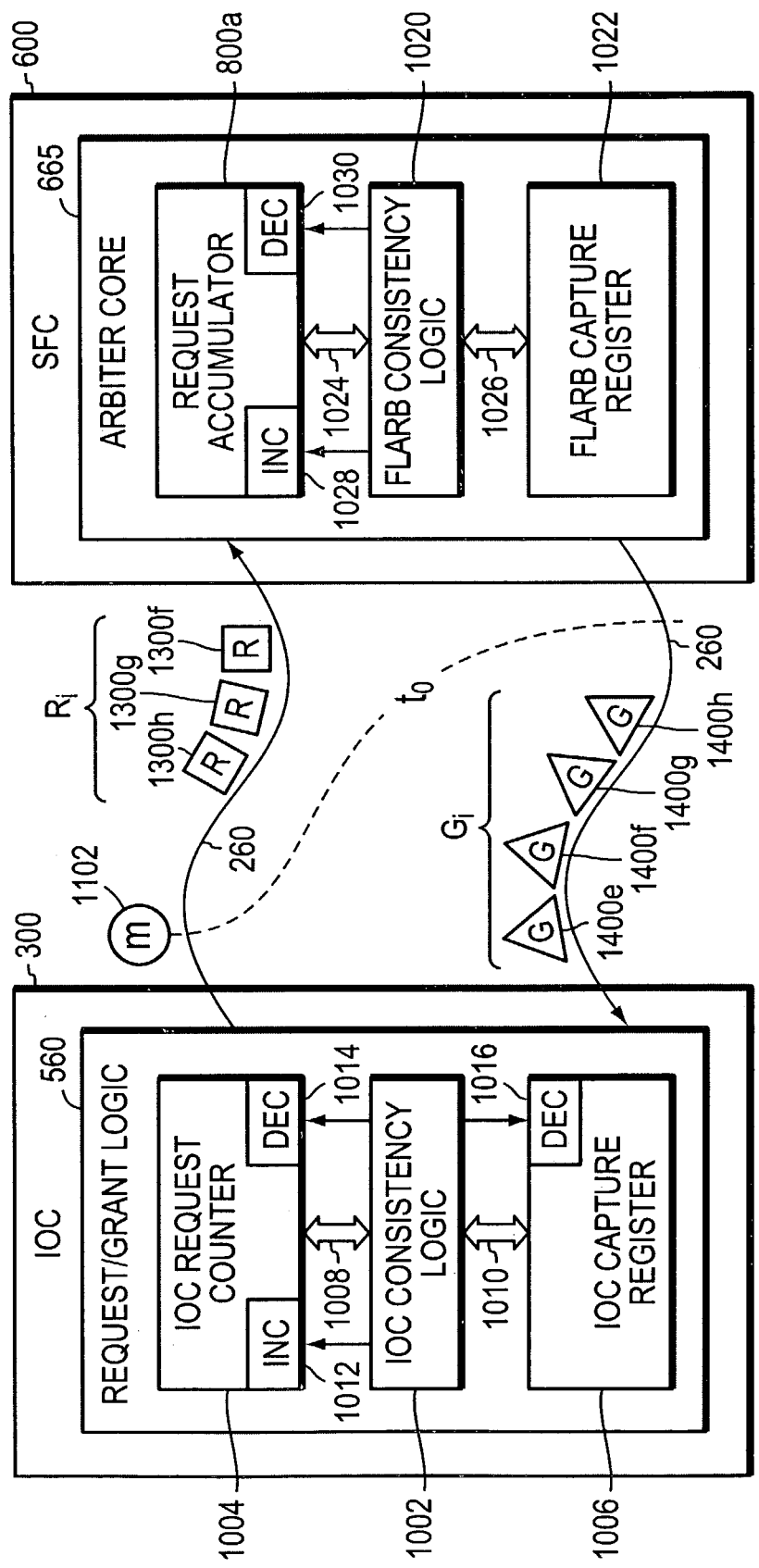
Figure 12:
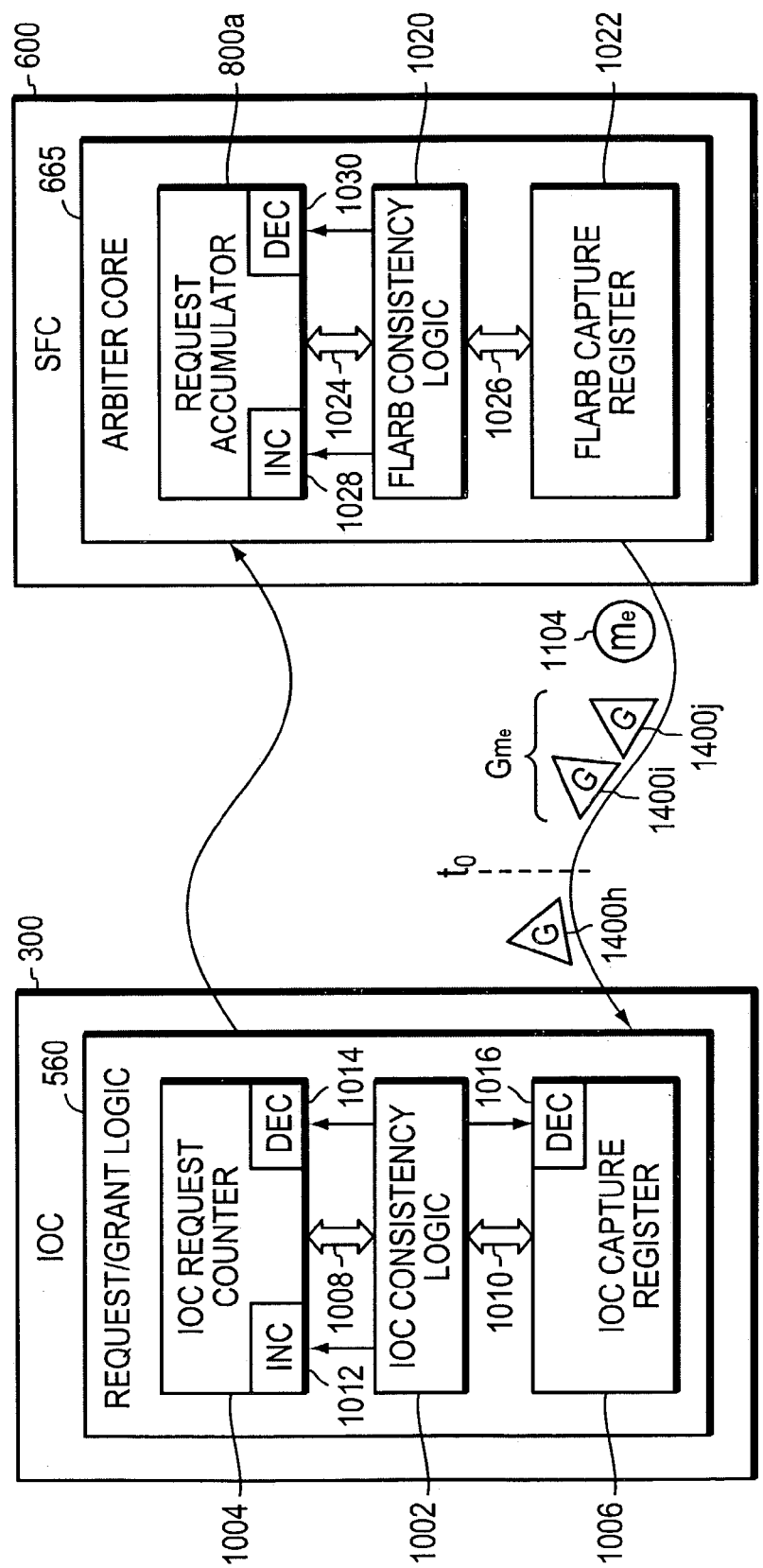

As described above in connection with FIG. 8, in the illustrative embodiment, each IOC 300 has a separate counter 1004 (and corresponding register 1006) for each target, i.e., destination, IOC 300. As described herein, each counter 1004 aggregates the requests from all VOQs destined for the respective target IOC. For purposes of explanation, only a single request counter 1004 and its companion capture register 1006 are shown in FIGS. 10–12.

The arbiter core 665 includes FLARB consistency logic 1020 and, as mentioned above, a plurality of request accumulators, such as accumulator 800a, and a plurality of FLARB capture registers 1022. Again, there is a respective capture register 1022 associated with each request accumulator 800. Specifically, there may be one FLARB capture register 1022 for all of the request accumulators organized for a given destination IOC. The FLARB consistency logic 1020 is operably coupled to both the request accumulators 800 and the FLARB capture registers 1022 so as to retrieve the contents of the request accumulator 800 and load those contents into the capture registers 1022 as schematically illustrated by arrows 1024 and 1026. Additionally, the arbiter 665 and/or FLARB consistency logic 1020 can increment and decrement the request accumulators 800 as schematically illustrated by increment (INC) and decrement (DEC) buttons 1028 and 1030.

In the preferred embodiment, the IOC and FLARB consistency logic circuits 1002 and 1020 are implemented in hardware through a plurality of registers and combinational logic configured to produce sequential logic circuits and cooperating state machines, such as through one or more specially designed Field Programmable Gate Arrays (FPGAs) and/or Application Specific Integrated Circuits (ASICs). Alternatively, these logic circuits may be implemented through one or more software modules or libraries containing program instructions pertaining to the methods described herein and executable by one or more processing elements, or they may be implanted through various combinations of software and hardware, including firmware.

As described above, the IPP 500 issues requests (R), such as requests 1300a–e to SFC 600 via control links 260. The requests cause the respective request accumulators 800 to be incremented. The arbiter core 665, moreover, retires the requests 1300 stored at the request accumulators 800 by issuing grants (G), such as grants 1400a–d, to the IOC also via control links 260. Upon receipt of a grant, which specifies a particular destination IOC, to which a cell may be switched, the source IOC determines from which of its VOQs a cell will be selected for transmission across the switch fabric. The IOCs and SFCs, moreover, are physically separated from each other and may operate in different time or clock domains. For example, the SFC is unaware of in-flight requests, i.e., requests that have been issued by the IOC but not yet received. Similarly, the IOC is unaware of in-flight grants from the SFC.

In the illustrative embodiment, the SFC 600 does not return acknowledgements (ACKs) to the IOC 300 in response to receiving the requests 1300. Similarly, the IOC 300 does not return ACKs to the SFC 600 in response to receiving grants 1400. Instead, each entity or module assumes that its message was received, and error correction codes are preferably loaded into the messages. Although the absence of such ACKs improves system performance by reducing the communications overhead consumed by control messages, the loss of individual requests 1300 or grants 1400 will typically go undetected by the system. Indeed, requests 1300 issued by the IOC 300 and grants 1400 issued by the SFC 600 may be lost for any number of reasons, such as noise, power fluctuations, etc. Furthermore, despite the high level of quality control in the manufacturing of electrical and electronic components, all electronic modules, such as the IOC 300 and the SFC 600, will have some error rate. Although it is less likely, these conditions could also result in requests or grants being gained. That is, the SFC could detect the receipt of a request that was never sent by the IOC 300. Similarly, the IOC could detect a grant that was never sent by the SFC. Accordingly, during the operation of switch 200, requests 1300 and/or grants 1400 may be lost or gained. The loss of one or more requests 1300 may reduce the performance of the switch. That is, a source IOC may find that it is taking longer than expected to receive grants for a particular destination IOC as one or more of the requests and/or grants for this destination IOC have been lost.

The present invention provides a system and method for determining whether requests and/or grants between the IOCs and the SFCs have been lost or gained. In the illustrative embodiment, the system and method does not require that the control links 260 be shutdown or that they be flushed, e.g., by withholding (or suspending) the issuance of additional requests. That is, during the consistency checking operations of the present invention, the control links remain available for carrying requests and grants between the IOCs and the SFCs. The present invention is also highly efficient, in part, by consuming very little of the bandwidth of the control links 260.

During normal operation, the IOC consistency logic 1002 increments the IOC request counter 1004 for each request 1300 issued to the SFC 600, and decrements the IOC request counter 1004 for each grant 1400 received from the SFC 600. Accordingly, the request counter 1004 at the IOC 300 represents a running record of the number of outstanding requests that the IOC has pending from the point of view of the IOC. Similarly, the FLARB consistency logic 1020 accumulates the requests in the request accumulators 800 by incrementing the respective accumulator upon receiving each request 1300. The FLARB consistency logic 1020 also decrements the respective request accumulator 800 in response to issuing a grant 1400 to the IOC 300. Thus, the request accumulator 800a at the FLARB represents a running record of the IOC's outstanding requests from the point of view of the FLARB. Because the FLARB does not know how many, if any, requests from the IOC are "in-flight", i.e., issued but not yet received, and the IOC does not know how many, if any, grants from the FLARB are in-flight, the two accumulators will rarely contain the same values.

To check the consistency between a given IOC 300 and the request accumulators 800 at the SFC that are associated with the given IOC 300, i.e., to determine whether any requests issued by the given IOC and/or grants sent to the IOC have been lost and/or gained, the IOC consistency logic 1002 at the IOC 300 and the FLARB consistency logic 1020 at the SFC 600 cooperate in the performance of a consistency check operation or audit. The IOC consistency logic 1002 may be configured, e.g., programmed, to periodically, commence a consistency check operation and/or it may be directed, e.g., commanded, to do so at selected times by some another entity of the switch.

FIGS. 11–12 are highly schematic diagrams illustrating the interaction between the request/grant logic 560 of an IOC 300 (FIG. 3) and the arbiter 665 of an SFC 600 (FIG. 6) during different phases of a consistency check operation. In response to being triggered to commence a consistency check operation, the IOC consistency logic 1002 issues a special marker (M) message or signal 1102 (FIG. 11) to the SFC 600 via the same control links 260 used to carry the requests 1300, and loads the current value of the IOC request counter 1004 into the IOC capture register 1006. The time at which the IOC consistency logic 1002 issues the marker (M) 1102 is referred to as $t_0$. At time $t_0$, there may be one or more requests (R) that are in-flight, such as requests 1300*f–h*. The number of such in-flight requests (R) is referred to as $R_i$. Since the requests $R_i$ were issued before the marker (M) 1102, the request counter 1004 was incremented in response to each such request 1300*f–h*, and therefore the value stored at the request counter 1004 (and copied into the capture register 1006) at time $t_0$ accounted for the in-flight requests 1300*f–h*. The in-flight requests 1300*f–h*, however, by definition, had yet to be received at the SFC 600 at time $t_0$. Thus, the value stored by the request accumulator 800a, at time $t_0$, does not account for the in-fight requests 1300*f–h*.

Similarly, at time $t_0$, there may be one or more grants that are in-flight, such as grants 1400*e–h*. The number of such in-flight grants is referred to as $G_i$. Because the in-flight grants have yet to be received by the IOC at time $t_0$, the value stored in the IOC request counter 1004 (and copied into the capture register 1006) at time $t_0$ does not account for the in-flight grants 1400*e–f*. Nonetheless, the value stored at the SFC's request accumulator does account for the in-flight grants as of time $t_0$.

After issuing the marker (M) 1102, the IOC consistency logic 1002 continues to increment the IOC request counter 1004 for each request 1300 issued by the IOC and continues to decrement the IOC request counter 1004 in response to receiving each grant 1400 from the SFC 600. Thus, just as before the marker (M) 1102 was issued, the IOC request counter 1004 continues to reflect the number of requests 1300 that are outstanding from the point of view of the IOC 300. Notably, the IOC consistency logic 1002 does not increment the value stored in the IOC capture register 1006 after issuing the marker (M) 1102. It does, however, decrement the capture register 1006 in response to each grant that is received after issuing the marker (M) 1102.

When the marker (M) 1102 reaches the arbiter core 665 of the SFC 600, it is detected by the FLARB consistency logic 1020. In response, the FLARB consistency logic 1020 captures the current value of each request accumulator 800a corresponding to the IOC 300 that sourced the marker (M), stores the retrieved values in the respective FLARB capture registers 1022, and returns the marker (M), which at this point may be referred to as a mark echo ($M_e$) 1104 (FIG. 12) back to the source IOC 300. The FLARB consistency logic 1020 may operate the selector 850 (FIG. 8) in order to transfer the contents of the appropriate request accumulators 800 to the capture registers 1022. Thereafter, the FLARB consistency logic 1020 continues to increment the request accumulator 800a in response to each received request (R) 1300 and to decrement the request accumulator 800a as each grant (G) 1400 is issued to the IOC 300. The FLARB consistency logic 1020 does not, however, either increment or decrement the FLARB capture register 1022 after having loaded it with the value of the request accumulator 800a upon receipt of the marker (M) 1102.

In addition to the grants $G_i$, if any, that were in-flight at time $t_0$, there may be zero, one or more grants issued between the time $t_0$ and the time the FLARB consistency logic 1020 returns the mark echo 1104 to the IOC 300, such as grants 1400*i–j*. These grants are referred to as $G_{me}$. When the mark echo 1104 is received back at the IOC 300, the IOC consistency logic 1002 stops decrementing the IOC capture register 1006 in response to any grants 1400 received after the mark echo 1104. The IOC consistency logic 1002 does, however, continue to decrement the IOC request counter 1004 in response to grants 1400 received after the return of the mark echo 1104 to the IOC 300. Thus, at this point (the return of the mark echo to the IOC), the value stored in the IOC capture register 1006 on the IOC 300 and the value stored in the FLARB capture register 1022 are fixed. That is, neither register is modified after this point.

Applicant has discovered that, assuming there are no requests and/or grants lost or gained, then at time $t_0$, the value stored at the IOC request accumulator 1004 less the number of in-flight grants ($G_i$) should equal the value stored at the request accumulator 800$a$ plus the number of in-flight requests ($R_i$). Written in equation form, this becomes:

$$RC_0 - G_i = RA_0 + R_i \quad (1)$$

where, $RC_0$ equals the value of the IOC request counter 1004 at time $t_0$, and $RA_0$ equals the value of the request accumulator 800$a$ at time $t_0$.

Equation (1) may be rewritten as:

$$RC_0 = RA_0 + R_i + G_i \quad (2)$$

Furthermore, when the marker (M) 1102 reaches the arbiter core 665, then the value of the request accumulator 800$a$, $RA_m$, is given by the following equation:

$$RA_m = RA_0 + R_i - G_{me} \quad (3)$$

As mentioned above, this value is copied into the FLARB capture register. Accordingly, the value stored at the FLARB capture register 1022, FCR, is given by:

$$FCR = RA_0 + R_i - G_{me} \quad (4)$$

Now, when the mark echo 1104 reaches the request/grant logic 560 at the IOC 300, the value stored in the IOC capture register 1006, ICR, is given by:

$$ICR = RC_0 - G_i - G_{me} \quad (5)$$

Comparing the two capture registers gives the following:

$$ICR - FCR = (RC_0 - G_i - G_{me}) - (RA_0 + R_i - G_{me}) \quad (6)$$

Substituting for $RA_0$ from equation (1) into equation (6) gives:

$$ICR - FCR = (RC_0 - G_i - G_{me}) - (RC_0 - G_i - R_i + R_i - G_{me}) \quad (7)$$

or $$ICR - FCR = RC_0 - G_i - G_{me} - RC_0 + G_i + R_i - R_i + G_{me}$$

or $$ICR - FCR = 0$$

In other words, $$ICR = FCR \quad (8)$$

That is, upon return of the mark echo 1104 to the IOC 300, the value stored at the IOC capture register 1006 will equal the value stored at the FLARB capture register 1022, provided that no requests 1300 and no grants 1400 have been either lost or gained.

The SCP 620 or some other management entity of the switch 200 preferably retrieves the contents of each pair of matching capture registers 1006 and 1022 following the return of the mark echo 1104 to the IOC 300. As illustrated in FIG. 8, for the IOC being audited, there is a capture register 1006 for each possible destination IOC and a matching FLARB capture register 1022 for each such IOC capture register. The check on each matching pair of registers may be performed in the background at any time. In-deed, each register 1006, 1022 of a given pair may be accessed at different times. Upon recovering the values of a selected pair of capture registers 1006 and 1022, the SCP compares them. If they are the same, then no requests 1300 or grants 1400 are being lost or is gained between the given IOC and the FLARB at least for the destination IOC represented by the FLARB capture register 1022 being examined. Assuming the two values of each pair of capture registers 1006, 1022 are the same, then no requests 1300 or grants 1400 are being lost or gained between the given IOC and the FLARB. In this case, no action needs to be taken by the SCP 620. If, however, the two values from any pair of registers 1006, 1022 differ, indicating that one or more requests and/or grants have been lost and/or gained, the SCP 620 may be configured to respond in any number of ways.

Preferably, the SCP 620 runs one or more additional consistency check operations before "concluding" that requests and/or grants have been lost and/or gained. If such a conclusion is reached, the SCP 620 can trigger an alarm, interrupt or other status message to a network administrator. Furthermore, the request accumulators 800 can be reset or set to a selected value. Alternatively or additionally, the control links 260 can be torn-down and re-synchronized. Those skilled in the relevant art will recognize that other alternatives are also possible.

The consistency check or audit described herein may be performed periodically as part of a general check on the operation of the switch. Alternatively, it may be run in response to the detection of some condition, such as degraded switch performance or the detection of errors on the control links 260 by, among other things, detecting error code symbols on the links, incorrect parity bits or incorrect check codes. It should be understood that each IOC 300 may be configured to commence a consistency check or audit automatically at preselected or programmed time periods or intervals. Furthermore, the SCP 620 or other management entity, knowing the times (or frequencies) at which the IOCs commence the audits, may automatically retrieve and compare the respective capture registers. Nonetheless, those skilled in the art will understand that other arrangements for performing the consistency check can be implemented.

As shown, with the present invention, the loss and/or gain of requests and/or grants between the IOCs and the SFCs can be checked without having to shutdown or stall, e.g., flush, the links between those modules. The consistency checking operation can also be performed without having to shutdown those modules. Furthermore, the marker and its associated mark echo preferably consume almost no time or bandwidth of the control links 260.

It should be understood that the marker 1102 and the mark echo 1104 can take many forms. For example, they may constitute independent messages. In the preferred embodiment, the marker 1102 is a 1-bit flag or field appended to the next request issued by the IOC following the instruction to perform a consistency check. The mark echo 1104 may be a multi-bit field appended to the next grant issued after receiving the marker 1102.

In the illustrative embodiment, the time for a marker to be generated at an IOC, processed at the SFC and returned (in the form of a mark echo) back to the IOC is bounded interval. An error condition that results in the marker or mark echo being lost can be inferred if the mark echo is not received back at the IOC within this bounded interval. In this case, the IOC can be configured to commence another consistency check or audit. That is, the IOC may activate a timer (not shown) upon issuing the marker 1102. If the timer expires without the IOC having received the mark echo 1104, the IOC presumes that the marker or mark echo has been lost and starts the consistency check process again. It is also possible that a marker 1105 or mark echo 1104 could be erroneously created by an error event or condition. In a preferred embodiment, checksums and/or parity bits are employed in the requests and grants to guard against such error events. Furthermore, if a discrepancy is found between the capture registers following a consistency check, the IOC preferably runs one or more additional consistency checks to confirm the error.

Figure 13:
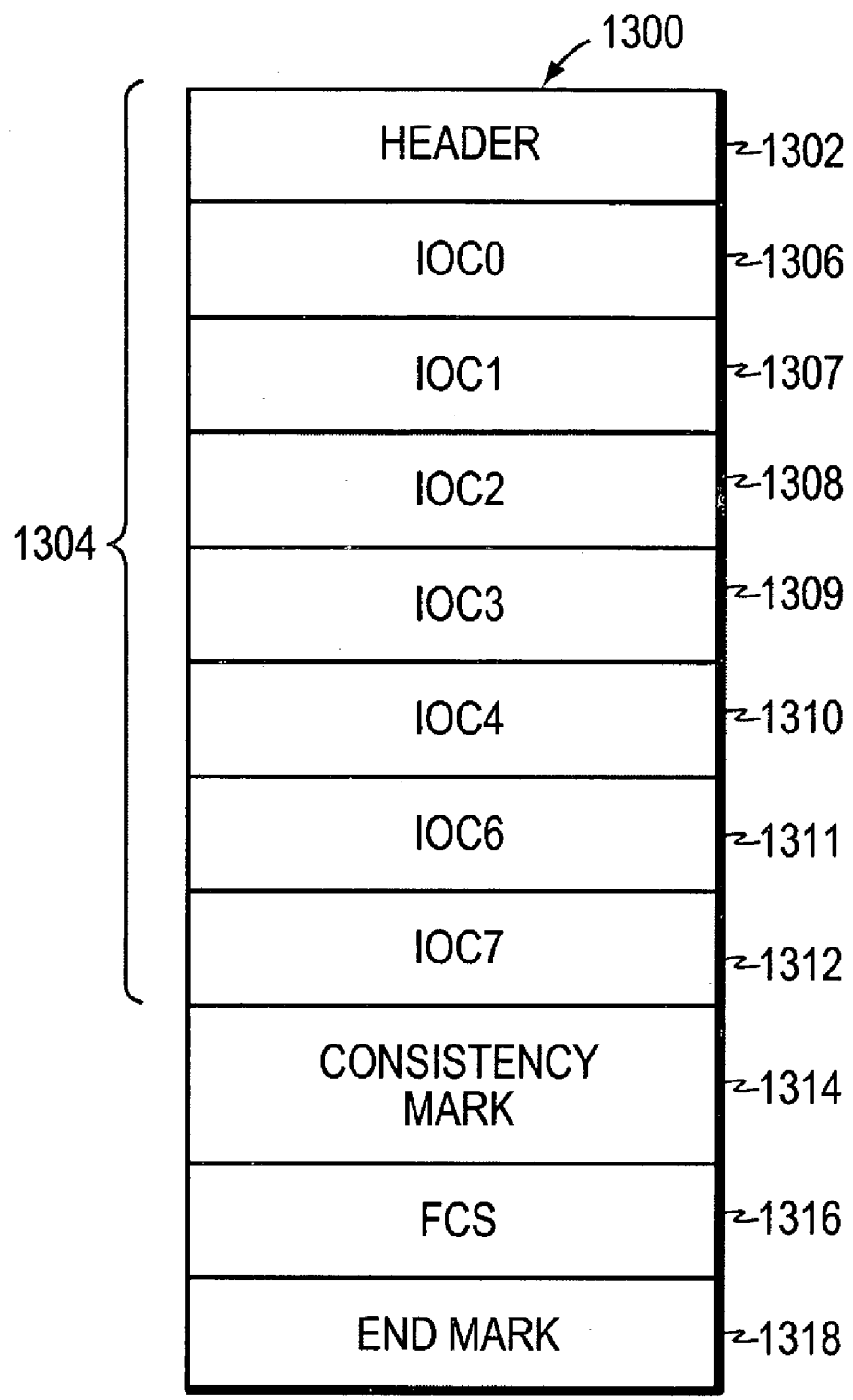
FIGS. 13 and 14 are schematic block diagram of messages that may be advantageously used with the present invention.

FIG. 13 is a highly schematic illustration of a request 1300. In the preferred embodiment, each request is a bit mask for requesting a time slot to send a data cell from the source IOC to one or more selected destination IOCs. The request 1300 includes a header 1302 that may comprise one or more sub-fields (not shown) and a vector 1304 having a separate 1-bit mask field 1306–1312 for each possible destination IOC. The source IOC asserts one or more of the bit masks 1306–1312 of the vector 1304 to indicate that it has a data cell to be sent to each such destination IOC. For example, assertion of bit masks 1307 and 1311 indicates that the source IOC has a cell that is to be sent to IOC1 and IOC6, respectively. In accordance with the present invention, the request 1300 further includes a 1-bit consistency marker field 1314. If the consistency marker field 1314 is asserted, the request 1300 is considered to include a marker (M) 1102. The IOC consistency logic 1002 and the FLARB consistency logic 1020 may be configured to treat the asserted bit masks, e.g., masks 1307 and 1311, of the request 1300 as requests (R) that were issued ahead of the marker (M) 1102. Alternatively, the IOC consistency logic 1002 and the FLARB consistency logic 1020 may be configured to treat the asserted bit masks as requests (R) that were issued after the marker (M) 1102.

The request 1300 may also include a frame check sequence (FCS) field 1316 and an end mark field 1318 signaling the end of the request 1300.

Those skilled in the art will recognize that the request 1300 may take other forms. For example, it may include greater, fewer or other fields.

Figure 14:
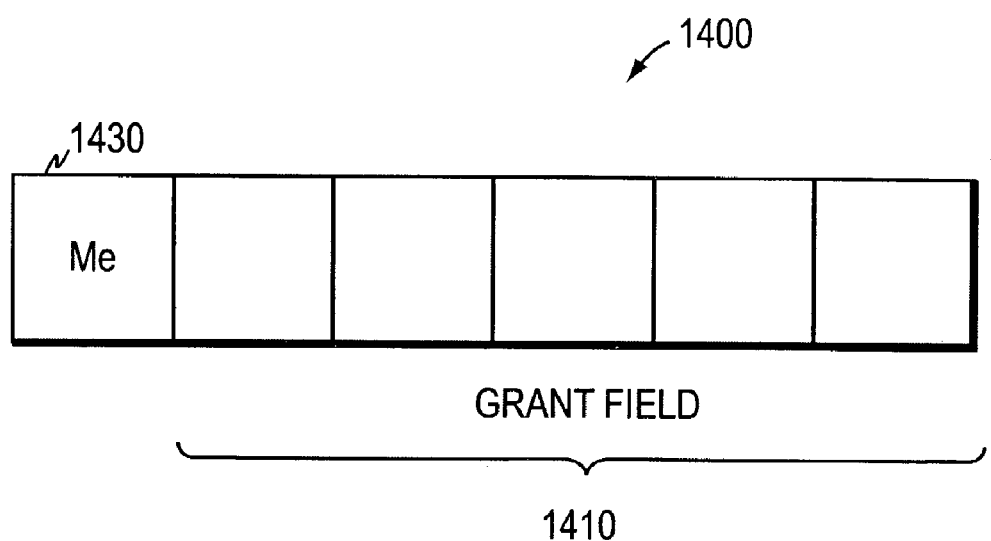

FIG. 14 is a schematic block diagram illustrating a grant message 1400. The grant message 1400 includes an encoded value within a grant field that grants a source IOC a time slot to send its cell to the SFC for switching to a destination IOC. Specifically, each grant 1400 is a 7-bit message comprising a 6-bit grant field 1410 containing an encoded value indicating to which destination IOC (e.g., of a possible 32 destination IOCs) the receiving IOC can send its cell. For example, encoded values "32" through "63", inclusive, may represent a valid grant for switch ports "0" through "31", respectively, while encoded value "0" may represent no grants. A consistency mark echo bit 1430 of the 7-bit message indicates whether the grant 1400 includes a mark echo 1104. That is, if the first bit 1430 of the grant message 1400 is asserted, the message is considered to include or be a mark echo 1104 message.

Those skilled in the art will recognize that the grant message 1400 or the mark echo field 1430 may take other forms.

The IOC consistency logic 1002 and the FLARB consistency logic 1020 may be configured to treat the granted time slots specified in a grant message 1400 having its consistency mark echo bit 1430 asserted as grants (G) that were issued after the mark echo ($M_e$) 1104. Alternatively, the IOC consistency logic 1002 and the FLARB consistency logic 1020 may be configured to treat the granted time slot(s) as grants (G) occurring before the mark echo ($M_e$) 1104.

As shown, a single marker (M) from the source IOC is all that is needed to check all of the request counters at the source IOC and their corresponding request accumulators at the FLARB. In the preferred embodiment, there is only one marker (M) and its associated mark echo in-flight at any time. That is, a second consistency check operation from the same or a different IOC is preferably not commenced until the mark echo from the previous consistency check operation is returned (and the values from the two capture registers retrieved). Nonetheless, those skilled in the art will recognize that by utilizing replicated counters and capture registers and/or other techniques multiple markers can be used simultaneously.

Although it has been described in connection with two different modules, e.g., two different FPGA or ASIC devices, it should be understood that the present invention can be used with different entities disposed on the same module that are exchanging signals. It may also be used in other environments besides a network switch.

It should also be understood that other arrangements of capture registers at the IOC and/or the FLARB may be provided. For example, if the audits were limited to a specific source IOC and a specific destination IOC, i.e., an "ordered-pair of IOCs", then only a single capture register would be required on the FLARB. Similarly, rather than have a separate capture register for each request counter at the IOCs, one set of capture registers could be provided and that set utilized for auditing any one of the IOCs. Those skilled in the art will recognize that other alternatives are also possible.

The foregoing description has been directed to specific embodiments of this invention. It will be apparent, however, that other variations and modifications may be made to the described embodiments, with the attainment of some or all of their advantages. Further, it is expressly contemplated that the teachings of this invention can be implemented as software, including a computer-readable medium containing program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. In a system in which a first module issues a plurality of first messages to a second module that responds by issuing a plurality of second messages back to the first module, a method of checking whether one or more of the first or second messages have been lost or gained, the method comprising the steps of:
    providing a request counter at the first module;
    incrementing the request counter in response to each first message issued by the first module;
    decrementing the request counter in response to each second message received at the first module;
    providing a capture register at the first module;
    providing a request accumulator at the second module;
    incrementing the request accumulator in response to each first message received at the second module;
    decrementing the request accumulator in response to each second message issued by the second module;
    providing a capture register at the second module;
    issuing a marker message from the first module to the second module;

storing the current value of the request counter in the capture register of the first module upon issuance of the marker message;

upon receiving the marker message at the second module, copying the current value of the request accumulator into the capture register of the second module;

returning the marker message back to the first module;

decrementing the capture register of the first module in response to each second message received at the first module from the time the marker message is issued until the marker message is returned to the first module; and comparing the contents of the capture registers at the first and second modules.

2. The method of claim 1 further comprising the step of concluding that no first or second messages have been lost or gained if the compared contents of the two capture registers are the same.

3. The method of claim 1 wherein the marker message issued by the first module is part of a selected first message.

4. The method of claim 1 wherein the marker message returned by the second module is part of a selected second message.

5. The method of claim 1 wherein the first module is an input/output card (IOC) configured to send and receive messages to and from a computer network;

the second module is a switch fabric card (SFC) configured to switch messages from a source IOC to a destination IOC;

the first message is a request seeking authorization to send a received network message from a source IOC to a selected destination IOC via the SFC; and the second message is a grant providing authorization to the source IOC to send the received network message to the destination IOC via the SFC.

6. The method of claim 5 wherein the network switch is configured to operate in accordance with the InfiniBand Architecture (IBA) specification standard.

7. The method of claim 1 wherein the first and second modules are interconnected by a high-speed serial control link.

8. The method of claim 7 wherein the first and second modules operate on parallel data streams; and a plurality of serializer/deserializer (SERDES) devices are utilized to convert parallel data to serial data for transmission across the serial link and to recover parallel data from serial data received from the serial link.

9. The method of claim 1 wherein the first and second modules operate in different clock domains with respect to each other.

10. The method of claim 1 wherein, at any given time, there are one or more first messages issued by the first module but not yet received by the second module and one or more second messages issued by the second module but not yet received by the first module.

11. In a network switch having first and second entities configured to exchange messages, a system adapted to check whether one or more messages have been lost or gained, the system comprising:

a request counter at the first entity, the request counter configured to track the number of messages issued by the first entity;

a first capture register associated with the request counter;

a first logic circuit operably coupled to the request counter and the first capture register;

a request accumulator at the second entity, the request accumulator configured to track the number of messages received by the second entity;

a second capture register associated with the request accumulator;

a second logic circuit operably coupled to the request accumulator and the second capture register;

wherein, the first logic circuit increments the request counter in response to each message issued to the second entity, decrements the request counter in response to each message received from the second entity, issues a marker message to the second entity and copies a current value of the request counter into the first capture register, the second logic circuit increments the request accumulator in response to each message received from the first entity, decrements the request accumulator in response to each message issued to the first entity and, in response to receiving the marker message, copies a current value of the request accumulator into the second capture register and returns the marker message to the first entity, the first logic circuit decrements the first capture register in response to each message received between issuance of the marker message and its return, and a comparison of the first and second capture registers identifies whether one or more messages have been lost or gained.

12. The system of claim 11 wherein the network switch has a plurality of input/output cards (IOCs), the first entity is one of the IOCs, the second entity is a switch fabric card (SFC), and the IOC and SFC are each disposed on different modules.

13. The system of claim 11 wherein the messages issued by the IOC are requests to access one or more IOCs and the messages issued by the SFC are grants permitting the IOC to access one or more selected IOCs.

14. The system of claim 13 wherein the SFC has a set of request accumulators for each IOC that may be requested and, within each set of request accumulators, one request accumulator is assigned to each IOC.

15. The system of claim 14 further comprising at least one second capture register for each set of request accumulators.

16. The system of claim 15 wherein a single marker message checks all of the request counters of a given IOC and all of the request accumulators assigned to the given IOC.

17. The system of claim 11 wherein at any given time, one or more first and second messages are in-flight between the first and second entities.

18. In a system in which a first entity having a request counter and a capture register issues a plurality of first messages to a second entity having a request accumulator and a capture register that responds by issuing a plurality of second messages back to the first entity, a method of checking whether one or more of the first or second messages have been lost or gained, the method comprising the steps of:

incrementing the request counter in response to each first message issued by the first entity;

decrementing the request counter in response to each second message received at the first entity;

incrementing the request accumulator in response to each first message received at the second entity;

decrementing the request accumulator in response to each second message issued by the second entity;

issuing a marker message from the first entity to the second entity;

storing the current value of the request counter in the capture register of the first entity upon issuance of the marker message;

upon receiving the marker message at the second entity, copying the current value of the request accumulator into the capture register of the second entity;

returning the marker message back to the first entity;

decrementing the capture register of the first entity in response to each second message received at the first entity from the time the marker message is issued until the marker message is returned to the first entity; and comparing the contents of the capture registers at the first and second entities.

19. The method of claim 18 wherein at any given time, one or more first and second messages are in-flight between the first and second entities.

20. The method of claim 18 wherein the first and second entities are separate modules interconnected by one or more control links configured to carry the first and second messages between the first and second entities.

21. A network switch for receiving and forwarding packets with a computer network, the network switch comprising:

a plurality of input/output card (IOC) modules configured to send and receive packets to and from the computer network; and a switch fabric cards (SFC) in communicating relationship with the IOCs, the SFC configured to switch packets received from the computer network at a source IOC to a destination IOC for transmission back into the computer network, wherein at least one of the IOCs has IOC logic configured to issue a request to the SFC for sending a received packet to a destination IOC, a request counter configured to track the number of requests issued by the at least one IOC, and a first capture register associated with the request counter, the SFC has SFC logic configured to respond to the requests by issuing a grant to the at least one IOC providing authorization to send the received packet to the destination IOC, a request accumulator configured to track the number of requests received from the at least one IOC, and a second capture register associated with the request accumulator, the IOC logic increments the request counter in response to each request issued to the SFC, decrements the request counter in response to each grant received from the SFC, issues a marker message to the SFC and copies a current value of the request counter into the first capture register, and the SFC logic increments the request accumulator in response to each request received from the at least one IOC, decrements the request accumulator in response to each grant issued to the at least one IOC and, in response to receiving the marker message, copies a current value of the request accumulator into the second capture register and returns the marker message to the at least one IOC, the IOC logic circuit decrements the first capture register in response to each grant received between issuance of the marker message and its return, and a comparison of the first and second capture registers identifies whether one or more requests or grants have been lost or gained.

22. The network switch of claim 21 wherein the SFC implements a cross-bar switch fabric configured to switch packets in terms of fixed size cells.

23. The network switch of claim 22 wherein the at least one IOC has a separate request counter and companion capture register for each potential destination IOC, and the SFC has a set of request accumulators for each potential destination IOC and, within each set of request accumulators, one request accumulator is assigned to each IOC.

* * * * *